(12) United States Patent
Milton et al.

(10) Patent No.: US 11,755,800 B2
(45) Date of Patent: Sep. 12, 2023

(54) SOLVER CREATION TOOL FOR SYSTEM SIMULATION

(71) Applicant: University of South Carolina, Columbia, SC (US)

(72) Inventors: Matthew A. Milton, Lexington, SC (US); Andrea Benigni, Vaals (NL)

(73) Assignee: UNIVERSITY OF SOUTH CAROLINA, Columbia, SC (US)

(*) Notice: Subject to any disclaimer, the term of this patent is extended or adjusted under 35 U.S.C. 154(b) by 288 days.

(21) Appl. No.: 17/345,482

(22) Filed: Jun. 11, 2021

(65) Prior Publication Data

US 2022/0222406 A1  Jul. 14, 2022

Related U.S. Application Data

(60) Provisional application No. 63/064,480, filed on Aug. 12, 2020.

(51) Int. Cl.
*G06F 30/23* (2020.01)
*G06F 30/331* (2020.01)
*G06F 111/20* (2020.01)

(52) U.S. Cl.
CPC ........ *G06F 30/331* (2020.01); *G06F 2111/20* (2020.01)

(58) Field of Classification Search
CPC ............................ G06F 30/331; G06F 2111/20
See application file for complete search history.

(56) References Cited

U.S. PATENT DOCUMENTS

2018/0314780 A1* 11/2018 Bertilsson ................. G06F 8/20
2019/0370420 A1* 12/2019 Feng ....................... G06F 30/20

FOREIGN PATENT DOCUMENTS

| CN | 104919459 A | * | 9/2015 | ............. G06F 30/23 |
| CN | 104662541 B | * | 2/2018 | ............. G06F 30/23 |
| CN | 104950741 B | * | 7/2018 | ............. G05B 17/02 |
| CN | 110377004 A | * | 10/2019 | ......... G05B 23/0221 |

(Continued)

OTHER PUBLICATIONS

A. Benigni and A. Monti, "A Parallel Approach to Real-Time Simulation of Power Electronic Systems," IEEE Trans. Power Electronics, Sep. 2015, pp. 5192-5206, vol. 30, No. 9.

(Continued)

*Primary Examiner* — Kandasamy Thangavelu
(74) *Attorney, Agent, or Firm* — BURR & FORMAN LLP

(57) ABSTRACT

A method for generating a simulator of a target system includes parsing data defining operational components and component parameters, searching for and obtaining model code definitions within a library database, customizing the model code definitions based on the component parameters, constructing a system model, and generating solver code based the customized model code definitions of the target system. The solver code may be indicative of input and output operation of the target system. The method may also include concatenating the system model with the solver code to form a solver function definition for the target system, and converting the solver function definition into an field programmable gate array (FPGA) core or central processing unit (CPU) core for execution on a simulation device for the target system.

20 Claims, 22 Drawing Sheets

(56) References Cited

FOREIGN PATENT DOCUMENTS

JP           6020775 B1 * 11/2016  .......... G06F 11/3024

OTHER PUBLICATIONS

M. Milton, A. Benigni and J. Bakos, "System-Level, FPGA-Based, Real-Time Simulation of Ship Power Systems" IEEE Transactions of Energy Conversion, Jun. 2017, pp. 737-747, vol. 32, No. 2.
M. Difronzo, M. Milton, M. Davidson, and A. Benigni, "Hardware-in-the-loop testing of high switching frequency power electronics converters," 2017 IEEE Electric Ship Technologies Symposium (ESTS), 2017, pp. 299-304, Arlington, VA.
N. Lin and V. Dinavahi, "Detailed Device-Level Electrothermal Modeling of the Proactive Hybrid HVDC Breaker for Real-Time Hardware-in-the-Loop Simulation of DC Grids," IEEE Transactions on Power Electronics, Feb. 2018, pp. 1118-1134, vol. 33.
M. Milton and A. Benigni, "Latency Insertion Method Based Real-Time Simulation of Power Electronic Systems," IEEE Transactions on Power Electronics, Aug. 2018, pp. 7166-7177, vol. 33.
T. Ould-Bachir, H.F. Blanchette, and K. Al-Haddad, "A Network Tearing Technique for FPGA-Based Real-Time Simulation of Power Converters," Jun. 2015, pp. 3409-3418, vol. 62.
M. Matar and R. R. Iravani, "FPGA implementation of the power electronic converter model for real-time simulation of electromagnetic transients," IEEE Transaction on Power Delivery, Feb. 2010, pp. 852-860, vol. 25.
LB-LMC Solver C++ Library. (2019). [Online]. Available: https://github.com/MatthewMilton/LBLMC-Solver.
LB-LMC Solver C++ Code Generation Library, (2019). [Online]. Available: https://github.com/MatthewMilton/LBLMC-CodeGen.

* cited by examiner

```
class ComponentType
{
public:
    ComponentType(<<parameters>>);
    void update(real* sources, const real* x, <<inputs>>,
                <<source indices>>, <<node indices>>);

private:
    const <<parameters>>;
    <<states & fields>>;
};
```

```
template<unsigned int num_solutions, unsigned int num_sources, const real* incid>
void aggregateSources(real b[num_solutions], real sources[num_sources])
{
    for(unsigned int i = 0; i < num_solutions; i++)
    {
        b[i] = 0.0;
        for(unsigned int j = 0; j < num_sources; j++)
        {
            b[i] += incid[i*num_solutions+j]*sources[j];
        }
    }
}
```

```
template <unsigned int num_solutions, const real* invG>
void solveSystem(real x[num_solutions], real b[num_solutions])
{
    for(unsigned int i = 0; i < num_solutions; i++)
    {
        x[i] = 0.0;
        for(unsigned int j = 0; j < num_solutions; j++)
        {
            x[i] += invG[i*num_solutions+j] * b[j];
        }
    }
}
```

FIG. 6

```
#include <lbimc/lbimc.hpp>
using namespace lbimc;
typedef double real;

void ric_simengine(real x_out[2], real vg_magn)
{
    const static real dt = 50.0e-9;
    const static real invG[2][2] = <<2D array definition>>;
    const static real incidence[2][3] = <<2D array definition>>;

real sources[3] = {0.0,0.0,0.0};
    real b[2] = {0.0, 0.0};
    static real x[2] = {0.0,0.0,0.0};

static FunctionalVoltageSource VG(1000.0, 0.001);
    static Inductor L(dt, 100.0e-6);
    static Capacitor C(dt, 10.0e-6);

VG.update(sources, x, vg_magn, 1, 1, 0);
    L.update( sources, x, 2, 1, 2);
    C.update( sources, x, 3, 2, 0);

aggregateSources<2,3,incidence>(b,sources);
    solveSystem<2,invG>(x,b);
    x_out[0] = x[0];
    x_out[1] = x[1];
}
```

```
class ComponentGenerator
{
  public:
    ComponentGenerator(string name, <<parameters>>);
    void setTerminalConnections(<<node indices>>);
    void stampSystem(SolverEngineGenerator& seg);

private:
    <<parameters>>;
    unsigned int <<source indices>>;
    unsigned int <<node indices>>;
};
```

FIG. 8

```
class SolverEngineGenerator
{
public:
    SolverEngineGenerator(string model_name, unsigned int num_solutions);
    void insert<<code>>(string code);
    ConductanceMatrixGenerator& getConductanceMatrixGenerator();
    SourceAggregatorGenerator& getSourceAggregatorGenerator();
    string generateFunction(double eps);

private:
    vector<string> <<collections of source code>>;
    ConductanceMatrixGenerator cmg;
    SourceAggregatorGenerator sag;
};
```

FIG. 9

```
#name pes_circuit
#const dt 50.0e-9
FixedVoltageSource VG(1000.0, 0.001) {1, 0}
HalfBridgeLegConverter CONVERTER(dt, 100.0e-6, 10.0e-6, 0.001) {1, 0, 2}
Capacitor CFILTER(dt, 10.0e-6) {2, 0}
Resistor RLOAD(10.0) {2, 0}
```

SOLVER CREATION TOOL FOR SYSTEM SIMULATION

CROSS-REFERENCE TO RELATED APPLICATIONS

This application claims the benefit of U.S. Provisional Application No. 63/064,480 filed on Aug. 12, 2020, the entire contents of which are hereby incorporated herein by reference.

STATEMENT OF GOVERNMENTAL INTEREST

This invention was made with Government support under contract number N00014-16-1-3042 awarded by the Office of Naval Research. The Government has certain rights in the invention.

TECHNICAL FIELD

Example embodiments generally relate to computer simulation technologies and, more particularly, relate to the simulation of system, such as, for example, electrical and power electronic systems.

BACKGROUND

Modern power electronic system problems, with their ever faster dynamics, are not addressed by existing simulation tools due to the tool's slower computational performance. In this regard, there is a need for solutions in the form of software tools and associated systems to create fast simulators for use in at least these contexts. Additionally, in some instances, entirely custom development of simulators must be generated for an application, leading to substantial inefficiency and cost, while often still not realizing the necessary performance needs. As such, there continues to be a need to improve computer simulation technology to operate at high computational performance and improve the accuracy of simulation testing.

BRIEF SUMMARY OF SOME EXAMPLES

According to some example embodiments, an apparatus for generating a simulator of a target system is provided. The apparatus may comprise processing circuitry configured to parse data defining operational components and component parameters of the target system. Additionally, the processing circuitry may be configured to search for and obtain model code definitions for operational components within a library database, and customize the model code definitions based on the component parameters. Further, the processing circuitry may be configured to construct a system model based on the customized model code definitions for the operational components, and generate solver code based the customized model code definitions of the target system. In this regard, the solver code may be indicative of input and output operation of the target system. The processing circuitry may also be configured to concatenate the system model with the solver code to form a solver function definition for the target system, and convert the solver function definition into an field programmable gate array (FPGA) core or central processing unit (CPU) core for execution on a simulation device for the target system.

According to some example embodiments, an example method for generating a simulator of a target system is provided. The example method may comprise parsing data defining operational components and component parameters of the target system, searching for and obtaining model code definitions for operational components within a library database, and customizing the model code definitions based on the component parameters. The example method may also comprise constructing a system model based on the customized model code definitions for the operational components, and generating solver code based the customized model code definitions of the target system. The solver code may be indicative of input and output operation of the target system. The example method may also comprise concatenating the system model with the solver code to form a solver function definition for the target system, and converting the solver function definition into an field programmable gate array (FPGA) core or central processing unit (CPU) core for execution on a simulation device for the target system.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 4 illustrates example code segment for providing a common interface for constructing and updating a component instance according to some example embodiments;

FIG. 5 illustrates example code segment for a function to aggregate source contributions of component objects according to some example embodiments;

FIG. 6 illustrates example code segment for a function template of a system solver according to some example embodiments;

FIG. 7 illustrates example code segment for a simulation engine according to some example embodiments;

FIG. 8 illustrates example code segment for solver engine generator according to some example embodiments;

FIG. 9 illustrates example code segment for a generator declaration according to some example embodiments;

FIG. 10 illustrates example code segment for an example netlist according to some example embodiments;

DETAILED DESCRIPTION

Figure 1:
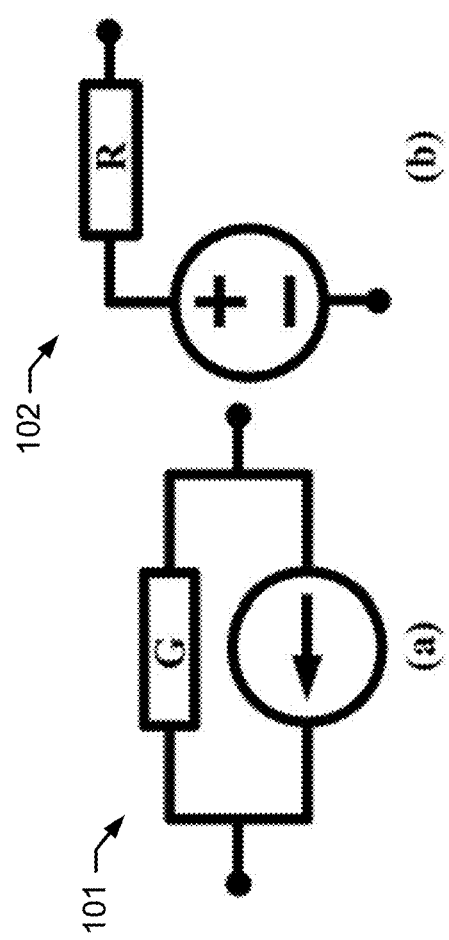
FIG. 1 illustrates example model components of a system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

According to some example embodiments, computer-implemented tools to rapidly model systems, such as, for example, electrical and power electronic systems are provided. Such tools may be operate to conveniently generate real-time simulation solvers of electrical and power electronic systems models that can be efficiently executed on, for example, Field Programmable Gate Array (FPGA) devices or central processing unit (CPU). According to some example embodiments, the solvers may achieve less than or equal to 50 nanosecond simulation time steps. Such example embodiments are necessarily rooted in computer technology to overcome the many technical problems described herein. Such problems may include those arising in the realm of computer simulations of real-world systems to be used in testing environments such as extreme lagging performance relative to real-world, real-time system operation.

According to some example embodiments, a set of tools for the creation of model solvers of systems including electrical and power electronic systems for use in high-performance real-time simulation is provided. The tools may allow system models to be defined in plain-text, and solver execution code can be, in some instances, automatically generated from generated models. The solvers, according to some example embodiments, may be runnable on, for example, FPGA technologies to achieve fast, high-fidelity real-time simulation for testing and prototyping.

The electrical and power electronic system simulation solvers, according to some example embodiments, may have computational speeds that are one or two orders of magnitude faster than other contemporary solutions, allowing for much smaller simulation time steps in real-time execution than before. Modern power electronic system problems, with their ever faster dynamics, are not addressed by conventional simulation tools due to their slower computational performance. However, according to some example embodiments, simulation speeds can be achieved that are more closely indicative of real-time operation of electric power systems.

According to some example embodiments, a set of tools are provided that utilize software and development libraries in the form of library databases, for example, developed in C++, for the creation of real-time, FPGA-based simulation solvers of electrical and power electronic systems with simulation time steps of 50 nanoseconds or below. The tools, according to some example embodiments, provide for the creation of C++ defined simulation solvers in C++ programming environments using metaprogramming (code generation) libraries. According to some example embodiments, a command line interface (CLI) tool may be implemented that can be an interface to generating the simulation solvers. An example C++ solver for a power electronic or electrical system model may be generated through the tools by first parsing, for example, netlist text defining the system to solve. From the components and parameters listed in the netlist, the tools may search through built-in or given user defined component models for each component in the system and then alter copies of the component model definition code with the given parameters in the netlist. Then, code may be generated by the tools to solve the component models and the overall system model for each simulation time step, using, for example, a Latency-Based Linear Multi-step Compound (LB-LMC) solver method, and this collected code may be concatenated together into, for example, a solver C++ function definition. This solver definition can then be passed to a high-level synthesis tool to be synthesized into, for example, a Field Programmable Gate Array (FPGA) execution core for FPGA-based real-time simulators.

As part of an Open Real-Time Simulation (ORTiS) framework, according to some example embodiments, a solver code generator (or codegen tool) may be implemented as a C++ solver code generator Command Line Interface (CLI) tool. The codegen tool may be implemented such that the tool generates C++ source code for solvers of multi-physics networked systems such as electrical, power electronic, and energy conversion systems. These systems may be defined, for example, using a netlist file, as mentioned above, which is input into the tool. According to some example embodiments, a solver algorithm that is used may be, for example, the LB-LMC method. The solver codegen tools may create simulation solvers of given systems, for example, as C++ function definitions tailored to the given system expressed by a plain-text netlist. It is noted that while descriptions herein are provided in the context of the C++ language, one of skill in the art would appreciate that any comparable coding language may be used to define example embodiments and the scope of the examples provided encompasses the use of alternative coding languages.

According to some example embodiments, the function definitions may be created through first parsing the parameters and component listings in the given netlist. Then, according to some example embodiments, the tools may search for and customize model code taken from a built-in or user provided library of component model definitions using given parameters. Next, the tools may generate C++ code to solve system equations and read/write I/O signals. Finally, the tools may concatenate the resultant model and system solver code into a C++ solver function definition. These C++ solver function definitions can then be passed to High-Level Synthesis (HLS) tools, such as Xilinx Vivado HLS, to be systematically converted to FPGA execution cores described in Hardware Description Languages (HDL)

such as VHDL or Verilog. These FPGA execution cores of the solvers can then be incorporated in FPGA-based real-time simulator designs to simulate the system of interest. Moreover, the generated solver definitions can also be used for high performance offline simulations or CPU-based real-time simulation as well.

According to some example embodiments, the LB-LMC solver method, which may be used in the solver codegen tools, can be a highly-parallelizable algorithm for solving nonlinear electrical/PE systems. Under the LB-LMC solver method, and others described herein, each component of a system may be defined as a discretized state space (SS) model that is embodied as a collection of voltage/current sources representing the memory terms of the model, with accompanying conductances embodying the memoryless model terms. From the models, a set of equations Gx=b may be produced to be solved at each simulation time step for x that consists of branch currents and node voltages of the system, with G and b respectively consisting of the memoryless and memory terms of the system component models.

Unlike some conventional methods, according to some example embodiments, all nonlinear component models in a system may be discretized with explicit integration (e.g., Euler Forward, Runge-Kutta), allowing nonlinear SS models to consist of only memory terms based on only past time step solutions. In this regard, linear components may be discretized implicitly (e.g., Trapezoidal). As such, the G term of Gx=b can be held constant throughout simulation and the set of equations for nonlinear systems can be solved without an iterative process (e.g., Newton-Raphson), allowing the nonlinear system to be quickly solved using linear approaches (e.g., LU (lower-upper) factorization or term arrangement) without loss of nonlinearity of the system. Moreover, according to some example embodiments, the LB-LMC method may be optimized to solve models of all system components entirely in parallel, allowing for computational speedups to achieve small time steps in real-time, especially with FPGA execution of the method. The method has been demonstrated to real-time execute multi-converter PE systems on FPGAs with 50 ns time steps (even on older FPGAs).

According to some example embodiments, the C++ libraries, possibly formed as library databases, to create high performance real-time simulators of power electronic systems are described. These libraries can utilize the LB-LMC method for the solver algorithm as described herein. C++ simulation solver engines created from these libraries may support both real-time CPU and FPGA execution, allowing for fast and flexible simulator implementations. These libraries may also support object-oriented simulator development and metaprogramming development utilizing code generation to produce heavily optimized solver engines for a given execution target. Details of these libraries and their application are described herein. Example cases of the usage of these libraries for FPGA-based simulation are provided to demonstrate capabilities of the libraries, allowing for real-time power electronic system simulators, as described herein, running with less than or equal to 50 ns time steps.

In the development of power electronic systems of, for example, ships, it is often required to perform Real-Time (RT) and hardware-in-the-loop (HIL) simulations of these systems to prototype and validate the design of the system before physical construction. Modern ship systems are expected to make large use of high switching frequency (e.g., 100-200 kHz) power electronic converters (e.g., SiC based). For reliable simulation of such high switching frequency power electronics systems, very small time steps of less than 100 ns may be required. To execute real-time simulation of power electronic systems at such time steps, Field Programmable Gate Array (FPGA) processors have recently become useful to achieve ≤1 µs, which allows for highly parallelized and low latency computations of simulations. However, there is a need for software tools and associated systems to create such fast simulators for use on a FPGA.

As mentioned above, example embodiments of a systems, apparatuses, and methods are described that leverage libraries, for example, C++ libraries for the rapid development of FPGA or CPU-executable real-time simulation solvers of large power electronic systems which are capable of nanosecond-range time steps. These libraries can utilize, for example, the LB-LMC simulation method specifically tailored for real-time simulations of such systems. These libraries can support the development of simulation solvers in C++ either using an object-oriented approach of assembling system models from interconnected objects, or through a code generation system that takes as input a user-definable component netlist of a system model and outputs C++ source code for the simulation solver tailored to the model and the target FPGA or CPU platform. These libraries can be applied to produce the FPGA simulation solver engines which are capable of executing in real-time with 50 ns discrete time steps.

Example LB-LMC Method

According to some example embodiments, an LB-LMC simulation method may be used with the libraries described herein. With respect to the LB-LMC simulation method and FPGA implementation, the following are incorporated herein in their entirety: A. Benigni and A. Monti, "A Parallel Approach to Real-Time Simulation of Power Electronic Systems," IEEE Trans. Power Electronics, vol. 30, no. 9, pp. 5192-5206, September 2015; M. Milton, A. Benigni and J. Bakos, "System-Level, FPGA-Based, Real-Time Simulation of Ship Power Systems," IEEE Transactions on Energy Conversion, vol. 32, no. 2, pp. 737-747, June 2017; and M. Difronzo, M. Milton, M. Davidson, and A. Benigni, "Hardware-in-the-loop testing of high switching frequency power electronics converters," 2017 IEEE Electric Ship Technologies Symposium (ESTS), Arlington Va., 2017, pp. 299-304.

The Latency Based Linear Multistep Compound (LB-LMC) method may be applied as a non-iterative, transient simulation method for the fast real-time solving of nonlinear multi-physics network systems such as power electronic and generation systems in discrete time steps. The method may be leveraged to model systems to solve as a linear set of equations Gx=b where x is a vector of system solutions, b is a vector of source contributions solved from state equations of components in the system, and G is the system coefficient matrix. Regardless of linearity or switching behavior of components of the system, the LB-LMC method can hold the matrix G constant for every time step. Source contributions of non-linear components in a given system may be kept separate from linear parts of the system, injected into the linear equations Gx=b through b so non-linear behavior of the system is maintained. To keep G constant and to avoid use of iterative solving (e.g., Newton-Raphson) for non-linear component solving, explicit discretization of component state equations may be applied. From these properties of the LB-LMC method, the method can solve non-linear systems using linear approaches.

With respect to component modeling, the LB-LMC method may model components of a system. As depicted in FIG. 1, the components may be modeled as voltage (across) source contributions at 101 or current (through) source contributions at 102, where the sources are updated from state equations of the component in question. Components with more than two terminals can be modeled with a collection of these sources. For linear components, the state equations are discretized using, for example, the Trapezoidal rule which introduces a series resistance or parallel conductance to the sources that models the memoryless terms of the discretization. These resistances and conductances may be imprinted into the G matrix of the system. Non-linear components may be discretized using explicit methods such as, for example, Euler Forward or Explicit Runge-Kutta, and introduce no resistance/conductance to the system, being modeled as only ideal voltage or current sources.

Figure 2:
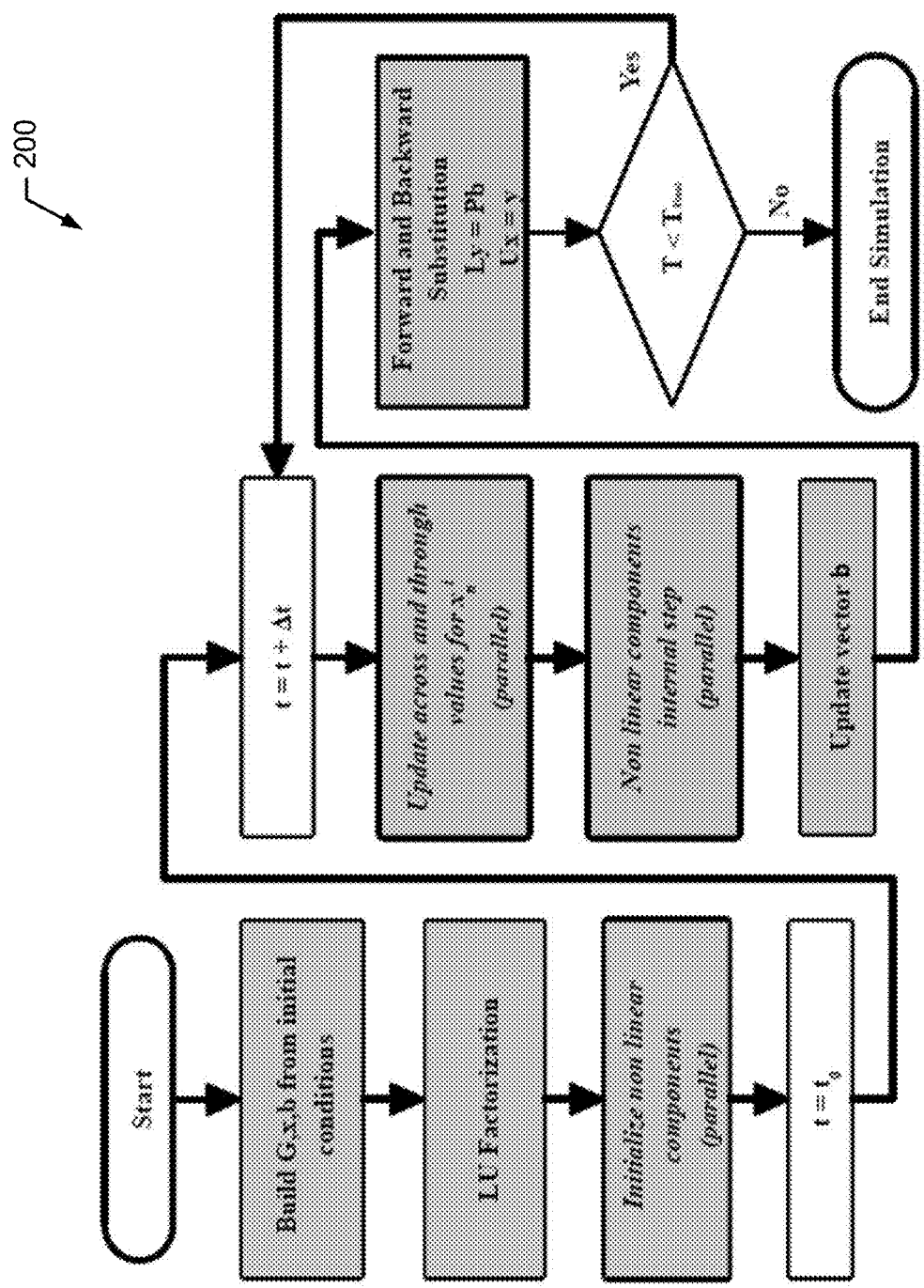
FIG. 2 illustrates example solution flow for a solver according to some example embodiments.

The solution flow 200 of FIG. 2 shows, according to some example embodiments, every time step under an LB-LMC method. Before online simulation, the system equations may be defined from the network of the system of interest and G may be pre-inverted. Then, the initial conditions of components and system solutions may be set before the simulation is online. After initialization, the simulation may go online, starting each time step with the solving of component state equations in parallel. Once all component equations are solved, their source contributions may be aggregated into b and the system solutions may be solved using $x=G^{-1}b$. If the simulation is to continue, a new time step execution may be started, using solutions from past time step.

Example Solver Implementation

Figure 3:
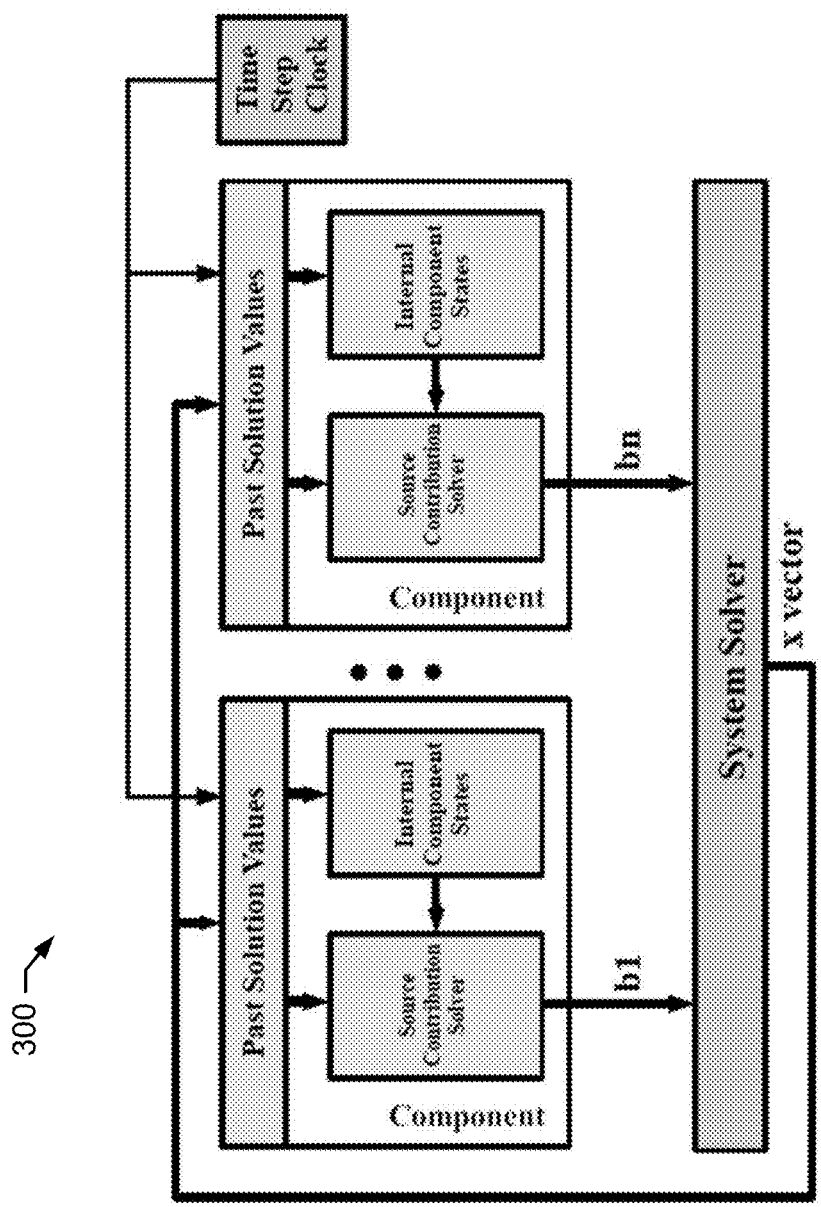
FIG. 3 illustrates example solver engine according to some example embodiments.

A description of CPU and FPGA implementation of LB-LMC method solvers will now be provided in accordance with some example embodiments. In this regard, with respect to component and system solver objects, the scheme of a LB-LMC solver engine is depicted in FIG. 3. In this scheme, each component of the system to solve may be encapsulated as a sub-solver object which solves the state equations and functional behavior of the component. Each component object may take as input relevant system solutions from a previous time step and any data signals that control the behavior of the component (such as gate signals for a power converter component). From only these inputs and the past states of the component, each component object may compute its source contributions for present time step.

To compute the system solutions x of the system for a present time step, a system solver object can be defined. This object may take as input the source contributions from the component objects after they are executed, and, from these inputs, compute vector b. With b and the pre-computed matrix $G^{-1}$, the solver object may then solve $x=G^{-1}b$ for the current time step.

In computing languages such as C++, these component and solver encapsulations may be definable as object-oriented classes. Instanced objects of these classes may be defined within a top-level object or function that encapsulates the LB-LMC solver engine of a system model, with data passed between the component and solver objects through variables and arrays. If the class definitions are designed to support high-level synthesis (HLS), the engine object and its components and solver elements can be converted into hardware description language definitions such as in VHDL or Verilog which are implementable to real-time FPGA execution cores. The LB-LMC C++ libraries described herein may be used to define LB-LMC solver engines in this fashion and support HLS.

With respect to computational parallelism, the LB-LMC method may be designed for execution parallelism for computational speedups which is reflected in its implementations. Component objects in the LB-LMC method may be designed to perform independent solving operations (i.e., independent from each other), depending only on past solutions and external inputs, allowing parallel execution. Such parallel execution can be implemented on, for example, CPU computer architectures through multi-threading where batches of component objects may be updated separately from one another in parallel worker threads, though each thread updates its assigned component batch sequentially. Finer parallelism may be achievable on FPGA architectures, which may be accomplished via each component object being given its own custom logic core that doesn't share resources with other cores, allowing full parallel execution. Moreover, each component core can execute on FPGAs in a cycle-less dataflow manner for further parallelism of individual arithmetic operations such as multiplication and addition/subtraction.

Though the system solver may be dependent on component contributions, introducing sequential flow, the system solver's vectorized operations to solve $x=G^{-1}b$ may be parallelizable. As $G^{-1}$ may be fixed throughout a simulation and non-iterative computations may be applied, the system of equations to solve can be divided up into batches and solved in parallel using worker threads for CPU execution or independent logic on FPGAs. Dataflow execution of the system solver may be applicable for FPGA implementation to further parallelize operations, allowing some system equations to be solved as soon as solutions from the component cores are propagated.

For real-time execution, operations of the LB-LMC solver engine may be scheduled so that each time step corresponds to a same, common time on a real clock. On CPU or DSP platforms, the solver engine object/function may be updated within a timed interrupt routine that may be triggered by a timer within the platform, with the trigger raised at every time step. On FPGA platforms, the execution of the LB-LMC solver engine may be scheduled using a system clock signal provided by FPGA platform containing the engine. The engine may be scheduled to execute and solve for system solutions in a single execution cycle. On the rising edge of the system clock, the engine may be triggered to execute for a new time step. To set the time step of the engine to real-time, the clock period may be set to the time step of the engine. The LB-LMC FPGA solvers may therefore be capable of executing in real-time with ≤50 ns discrete time steps.

Example Solver Object-Oriented Library

An object-oriented library (e.g., a C++ object oriented library) and its usage to create LB-LMC solvers will now be described. To facilitate development of simulation solver engines using the LB-LMC method, a library in the form of, for example, a custom open-sourced C++ library may be utilized. The library may provide class definitions for a collection of components and the system solver implemented. By creating instanced objects of these components and the system solver, and interfacing them, functions or classes can be produced to create a solver engine that is called every simulation time step. The library may be designed, for example, specifically for HLS, enabling FPGA designs to be created from the engines for high-performance real-time simulations. Further compilation for offline and real-time CPU execution may be fully supported. An improvement on the library described here is further described herein with respect to the code generation library. However, this library approach is presented here as an example of how LB-LMC solvers can be implemented, for example, in C++ and the solver engines that the code generation library can generate.

With respect to component classes and interfaces, the LB-LMC solver library may contain a collection of component class definitions for elements of a system model, such as capacitors, inductors, power converters, transformers, and the like. Each component class may define the parameters, states, and fields of a component, and may provide a common interface for the construction and updating of the component instance, as seen in the code segment 400 of FIG. 4. In this regard, a component may be instanced through its class' constructor, providing as arguments the parameters for the component, such as integration time step and component quantities (capacitance, resistance, inductance, etc.) which are stored as constants in the instanced object. Once a component is instanced, its contributions to the system model may be updated via the update method which takes as input: the unsigned integer node indices defining network connection of the component in system model; source indices that label sources within component; any inputs signals of various data types if supported by component; an observing pointer to an array of the system solutions x from past time step; and another observing pointer that references an array of component source contributions where the component will stores its updated contributions at positions specified by the source indices. The source contributions and system solutions are of real number data types that can be defined as either single or double precision floating point (float, double), or fixed point (Xilinx ap fixed, int/long), depending on executing platform. The type of the real valued variables and parameters can be systematically changed for the entire library using type definition (typedef) statements in C++.

With respect to source contribution aggregator functions, the LB-LMC solver library may provide a generic C++ function to aggregate source contributions of component objects into the vector b, as depicted in the code segment 500 of FIG. 5. This function is defined as a function template that is specialized with the number of solutions to solve in the system model (length of vector b); the total number of component sources in the system; and a 2D array passed via observing pointer that is the incidence matrix that indicates whether a source contributes to a b element via a coefficient of either −1, 0, or 1 defined from network connections of the component to system. A specialization of this function takes as a function argument the array storing the b vector computed by the function and the array storing the source contributions from the components. Using the sources vector array and the incidence matrix 2D array, the aggregator method may merely add up the source contributions that correspond to each b element via incidence elements. The resultant output array b may be passed to another function that solves the system model for x, described herein.

With respect to the system solver function, the generic system solver for a given model may be defined as function template, as provided in code segment 600, in the LB-LMC solver C++ library as shown in FIG. 6. The system solver function template may be specialized with the integer number of solutions and a 2D array, through an observing pointer, storing the inverted conductance matrix $G^{-1}$. Specializations of the function template may take as function arguments the array that will store the solution vector x, and the array storing the vector b computed by the source contribution aggregator functions.

While the system solver and source contribution aggregator functions of the solver C++ library may be sufficient for running LB-LMC method simulation of system models, their implementation with nested loops and iteration of 2D arrays may be non-optimal to achieve a fastest computational performance that benefits real-time execution. Depending on the system model, the inverted conductance and incidence matrices can be sparse, containing numerous zeroed, or significantly small, terms that have little or no effect on system solutions but yet are still iterated and computed on in the nested loops. Moreover, loops typically have execution overhead to enter and exit loop iterations which increase computational latency. To achieve optimal execution, the aggregator and system solver function definitions can be adapted for a specific system model to unroll the loops and discard ineffective terms explicitly. Example embodiments of the LB-LMC solver C++ code generation library presented in herein address these limitations.

With respect to the simulation engine implementation, a simulation solver engine may be created as either a function with static objects or as a class in C++ using the solver library. In this regard, FIG. 7 shows a pseudo example of a code segment 700 of a simulation engine, in this case for an example 2-node, 3-source RLC circuit implemented as a top-level function with static objects that persist between the function's calls. Every call to this function corresponds to a single time step during simulation. The constant parameters for the simulation engine are first defined such as component properties, time step (dt), the inverted conductance matrix array, and the source vector incidence matrix array. Then, the arrays for individual source contributions, source vector b, and the persistent solution vector v are defined. The objects of system model components are instanced statically using parameters set previously, and instanced before the function is called to zeroed initial conditions. Note that resistor components do not exist in the example as resistor elements can be embedded into the conductance matrix G before inversion. The statements following the definitions may perform the actual solving of the system model for a single discrete time step. The component states or behavior are updated by calling their update methods and storing their contributions into the source contribution array. This array may be passed to a specialized aggregateSources function that aggregates the source contributions into the source vector array. Finally, the simulation engine function completes the execution by calling a specialized solveSystem function to compute the system solutions from the source vector and inverted conductance matrix before the solutions are fed out into an array passed to the simulation engine function.

Implementation of the simulation engine may be dependent on the application of the engine and the platform the engine will target (e.g., CPU, FPGA). Functions with static objects like in the code segment 700 of FIG. 7 may be geared towards HLS where the function will be synthesized into a FPGA execution core; or where only a single instance of the engine will be used in CPU software simulation. For cases where multiple instances of the simulation engine can exist in same application design, defining the simulation engine as a class may be pragmatic since multiple separate objects of the class can be readily instanced in C++. The class of the given simulation engine would define the parameters and vectors as fields and provide an update method to solve the system model for a time step. Additionally, to avoid manual pre-computation of matrices and hand-coding of the simulation engine, the engine may be code generated using the library presented herein.

Example Solver C++ Code Generation Library

According to some example embodiments, a code generation library is now described that may be developed to produce high-performance, optimized LB-LMC solver engines for CPU and FPGA execution. While the C++ solver library discussed earlier is suitable for low-level development of LB-LMC solver engines, the library, so as to support a wide range of system models in a general and abstract fashion, can lack computation and resource usage optimizations. Any optimizations, such as removal of ineffective computational terms, unrolling loops, and inlining code, would need to be performed by hand using the object-oriented C++ library. To specialize and optimize solver engine designs automatically, a meta-programming code generation (codegen) library (e.g., library database) is described, according to some example embodiments, that is developed to generate the optimized C++ source code for these LB-LMC solvers.

With respect to code generation generally, the LB-LMC solver codegen library may be a collection of code generation C++ classes whose instances produce specialized C++ code concatenated together to create the definition of a LB-LMC solver engine. The library provides a collection of component generator classes to produce inlineable code to solve source contributions of different components. Also, the library provides classes to pre-compute system conductance matrices, and generate source contribution aggregation and system solving operations. According to some example embodiments, the codegen library may also provide support for parsing of system model plain-text netlists to define system models for which a solver engine is to be generated.

With respect to component generators, the parameter, field, and update code of system model components may be created with component generators from the codegen library. In this regard, pseudo declaration of the generators is shown in the code segment 800 of FIG. 8. In an application using the codegen library, the instance of each component's generator may be created by a constructor which takes as arguments the textual name of the component to be generated and a set of parameters for said component which are stored as fields by the generator. The node connections of the generated component in the system model may be defined by the setTerminalConnections( ) method which takes as an argument a collection of node indices stored by the generator. For the generator to produce code for the component it defines, the stampSystem( ) method may be called which internally generates the inline code for the component update operations, fields, and parameters, and passes the resultant code to a SolverEngineGenerator type object argument which will later assemble code to produce the complete solver engine. The component generators do not generate component class definitions, instead producing code that will be directly inlined into the body of the solver engine source code that is to be generated.

With respect to the solver generator, the source code generated by the component objects may be assembled by instances of the SolverEngineGenerator class whose pseudo declaration is presented in the code segment 900 of FIG. 9. SolverEngineGenerator objects may be instanced with their constructor which takes as arguments the textual name of the model the generated solver is for and the integral number of solutions that the solver will compute. From these arguments, these generator objects may configure two internal code generator objects which compute the inverted conductance matrix of the system model (ConductanceMatrixGenerator) and generate code of the source contribution aggregator (SourceAggregatorGenerator). For component code generators to pass code to SolverEngineGenerator objects, this class provides several insert code methods which store generated source as strings for the parameters, fields, and update statements of the components into several C++ string vectors of the SolverEngineGenerator objects. So that component code generators can embed their components' conductances into the system model conductance matrix that will be inverted, and for components to indicate their source incidence for the source aggregation, the SolverEngineGenerator objects may provide public access methods to their internal generator objects. These internal generator objects may provide their own interfaces to embed the conductances and set the source incidences of component elements. Through these methods and internal generators of SolverEngineGenerator objects, components stamp their code and conductance/incidence with their stampSystem( ) method that takes as argument SolverEngineGenerator objects.

Once component generators have stamped their code and other quantities into a SolverEngineGenerator object, this object may generate the solver engine source code through generate-Function( ) method. This method takes all of the stored source code strings, as well as the generated code strings from the ConductanceMatrixGenerator and SourceAggregatorGenerator objects, and concatenates them together into a valid C++ definition of a solver engine, stored as a C++ string. This string can then by written to source files to be used for compilation or HLS of simulators. During the generation of the system solver code in generateFunction( ) method, the equations to solve $x=G^{-1}b$ are expressed as a sum of product (SOP) statements separated from one another and inlined into the code without iteration loops. Any terms in these equations that are multiplied by zeroed elements of $G^{-1}$, or close to zero by magnitude E (eps) given as argument to generateFunction( ), are discarded to reduce computational cost of the generated solver engine. Moreover, any nonzero elements of $G^{-1}$ are inlined into the SOP statements as literal values to allow compilers and synthesizers to optimize around literals. Similarly, the source contribution aggregator may be generated as separate summing statements that add up only relevant source contributions for each element b without inclusion of incidence matrices, keeping number of operations low for lower computational cost.

With respect to the solver engine netlist creation, the LB-LMC solver codegen library may provide functionality to support generation of solver engines from plain-text netlists of system models. An example code segment 1000 of a netlist of a single power converter circuit supported by the codegen system is depicted in FIG. 10. In this netlist example, the name of the system model is defined by #name directive, taking a valid C++ label for the name. Components (including resistances) of the system model may be defined with single-line statements which express in order the component type, the valid C++ label of the component, the parameters of the component in parentheses, and the node terminal connections as indices in curly brackets. For easy definition of constants for parameters, constants may be defined in the netlist using #const directive which defines constant name and its value. These defined constants can then be referenced in other netlist statements.

To parse the netlists for code generation, the LB-LMC codegen library may provide a NetlistParser class whose instances may take as input a valid netlist, either as a file or a character string, and outputs system model definition data which describes the model for code generation. This model definition may then be taken by a SystemModelFactory object which instances the component and solver engine generator objects based on the definition. The instanced generators may then be used to code generate the C++ source code of the solver engine for the described system model.

Figure 11:
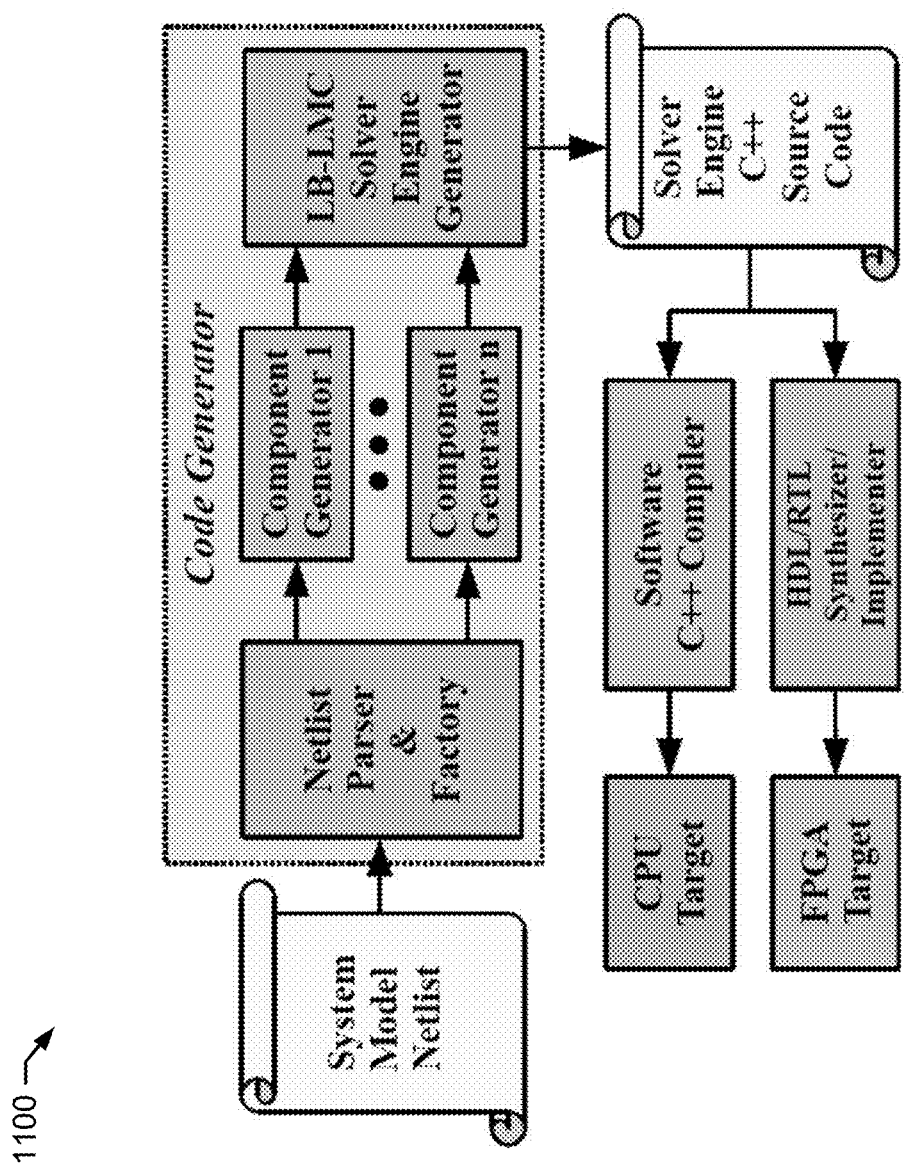
FIG. 11 illustrates example flowchart of a process to generate a solver engine according to some example embodiments.

With respect to code generation and implementation flow, the flowchart of FIG. 11 summarizes the flow 1100 to code generate LB-LMC solver engines from system model netlists and then implement these engines for execution onto CPU or FPGA targets, using the codegen library. First, a netlist of a system is defined as either a file or C++ string which is passed to a netlist parser object. This parser object creates a system model definition which is passed to a system model factory object that instances the component generators and solver engine generator tailored for the model. The component generators then generate source code for their components and pass their code, conductance, and source incidence to the solver engine generator. From the given data, the solver engine generator emits C++ source code that is savable to a file. The generated source code can then be passed to a C++ compiler, along with any other necessary source files, which can compile the source to executable binaries for CPU execution. Similarly, the source code can be passed to an FPGA tool (Xilinx Vivado Hlx suite) which can HLS the code to HDL and then implement this HDL into a Register Transfer Logic (RTL) design for fast FPGA execution of the solver engine.

Example FPGA Platform Top-Level Implementation

Figure 12:
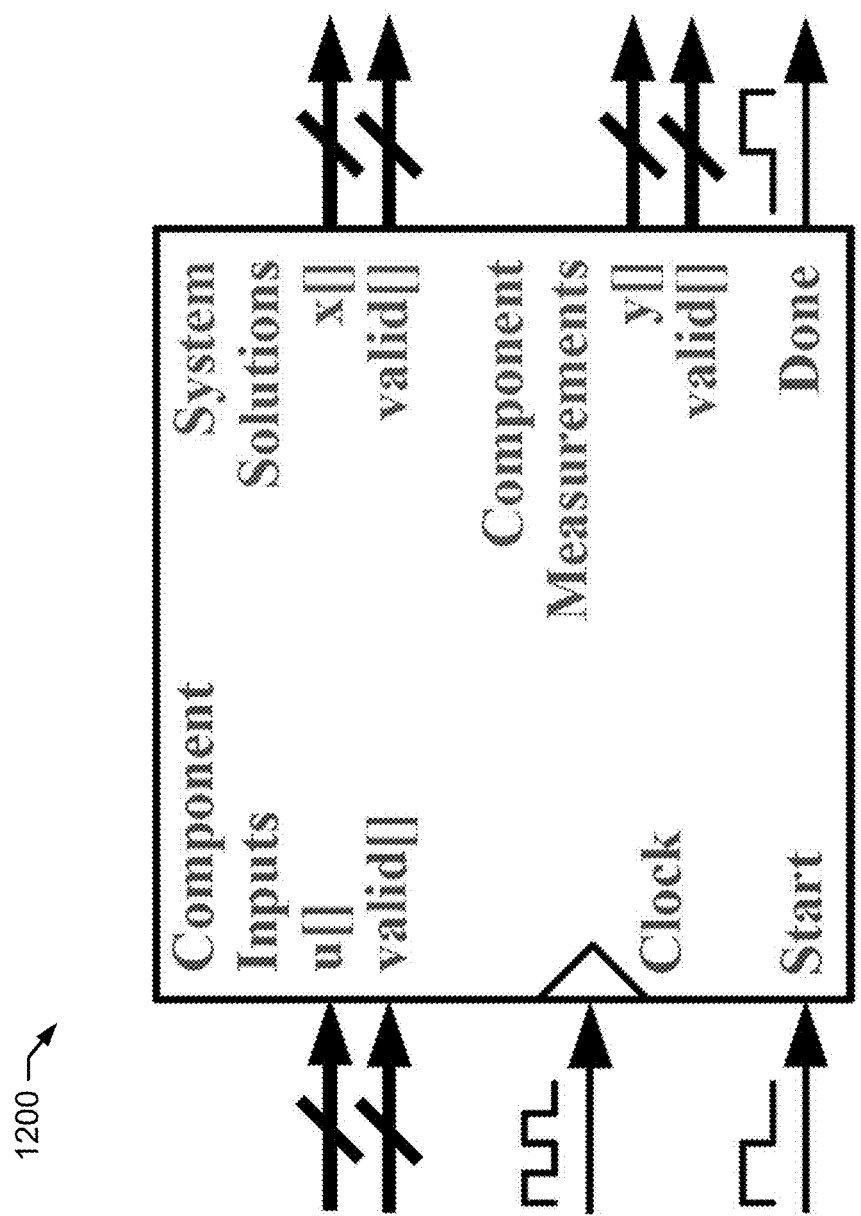
FIG. 12 illustrates example FPGA core and data ports according to some example embodiments.

The following describes some example requirements for LB-LMC solver engines to execute on an FPGA and to interface to other hardware such as network transceivers, controllers, and analog-digital converters. In this regard, with respect to solver core and data interfacing, an FPGA core 1200 of the engine and its data ports, from HLS of a LB-LMC solver engine C++ code, can be defined as in FIG. 12. The execution of the core may be driven by a single input clock signal. For single clock cycle real-time execution, the period of this clock may be equal the time step for the core. To control when the core is allowed to execute, a start flag input can be provided onto the core. When this flag is pulsed to go high, the core may be triggered to execute for a single time step. Once the core is completed executing, the core can raise a done flag signal that indicates to other logic that the core is finished. These clock and flag ports can be placed automatically in the core by the HLS tools.

Data may be moved in and out of the solver core through data ports which are defined from function parameters of the HLS C++ code. These ports non-exhaustively include model component inputs u[ ] (control signals for sources and converters, for instance), the outputs for the system solution a time step x[ ], and measurement outputs from components y[ ] (for example, power through a converter). Other data ports can be added to the solver engine core for particular application. If a solver engine core updates within multiple cycles, valid flags can be added to the input and output ports which indicate when the data on the port is valid for reading.

Word size and format of the core data ports may be dependent on the logic or hardware that will interface with the solver engine core. The port format can be different than that of words inside the core which require data conversion for internal data to be accessible by the ports. The data entering and exiting the core can be internally converted to an expected format in the core itself (conversion developed in original C++) or can be done externally, depending on application.

Figure 13:
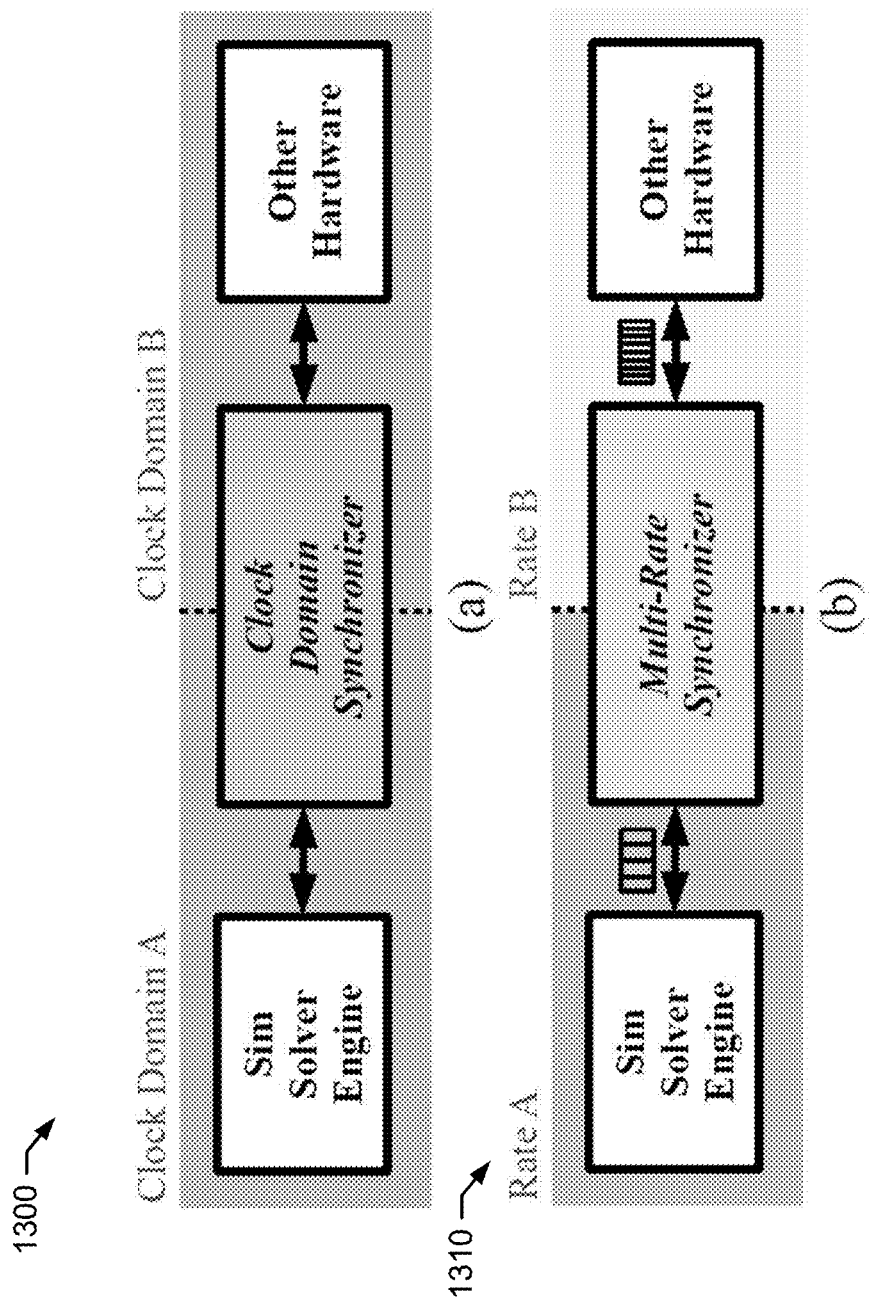
FIG. 13 illustrates example relational map of clock domains and rates according to some example embodiments.

With respect to multi-clock/rate domain crossing handling, as depicted in FIG. 13, hardware that interfaces with the solver core can potentially operate in different clock frequency and phase domains, or at different execution rates. To allow data to pass safely between solver core and hardware within other clock domains, Clock Domain Crossing (CDC) synchronizers are applied as shown in the relation map 1300. Depending on the difference in clock frequency or phase between domains, and on whether data is single or multi bit, a CDC synchronizer scheme is chosen, such as multi-flop synchronizers, multiplexer recirculation, First-In First-Out (FIFO) buffers, and more. In cases where the solver core and other hardware operate on same clock domain but different rates, a form of multi-rate synchronizer such as Finite State Machines (FSM), FIFO buffers, and communication handshaking, among others, can be used to control when and how data is passed safely as shown in the relational map 1310. A combination of schemes may be needed if the solver engine core and other hardware operate on different clock domains and execution rates.

Some Example Implementations

Figure 14:
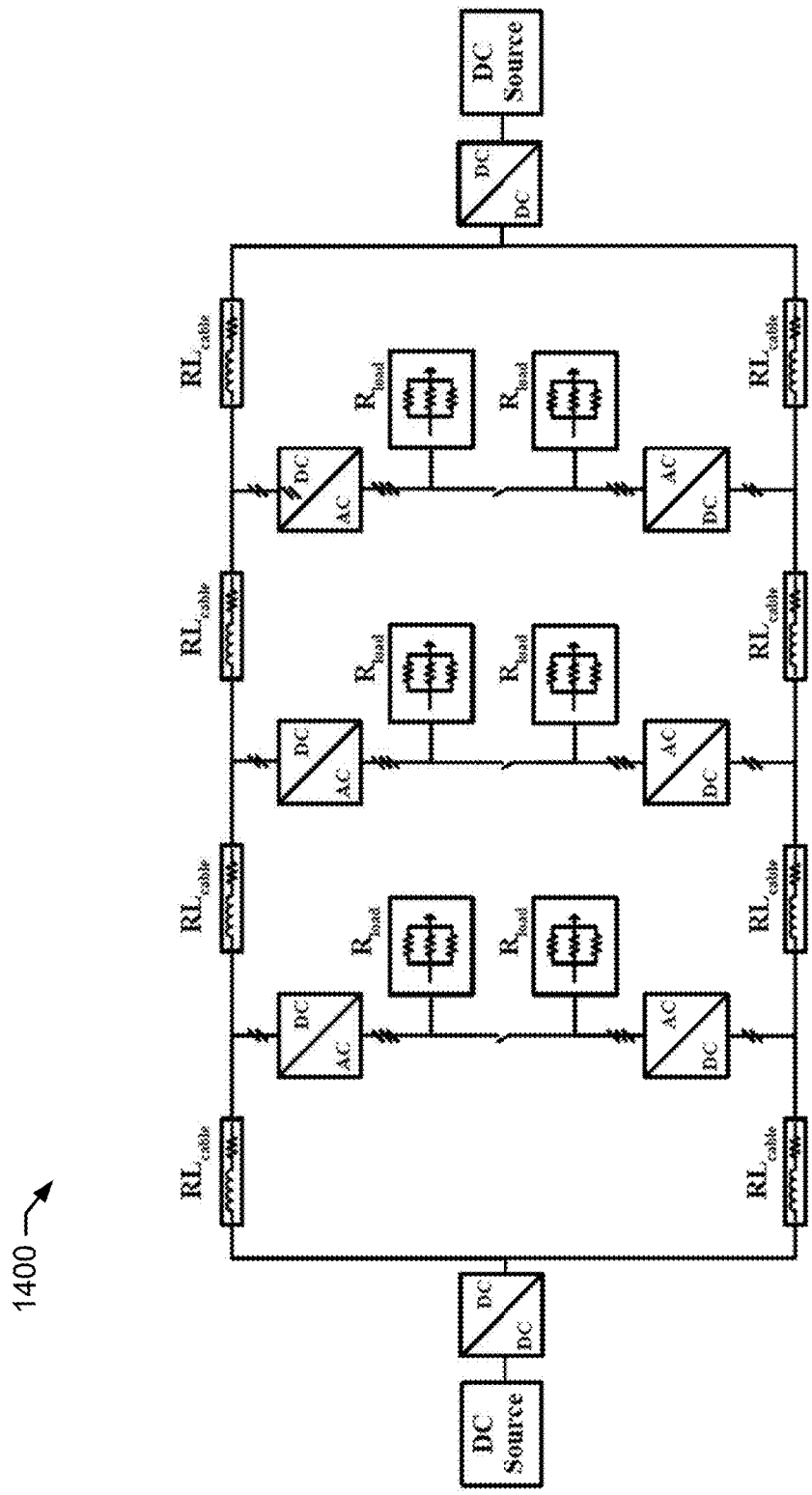
FIG. 14 illustrates example dual bus power system according to some example embodiments.
Figure 15:
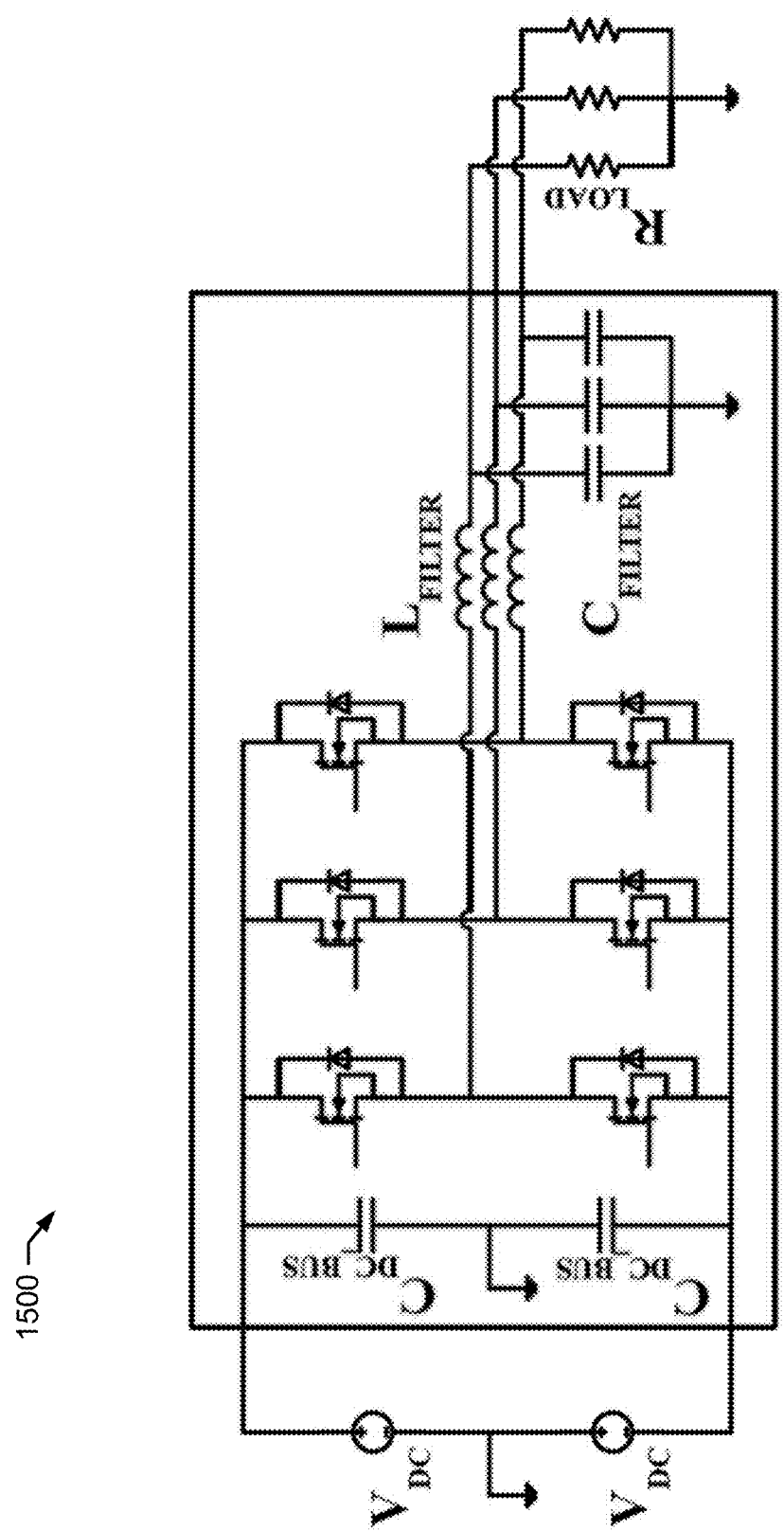
FIG. 15 illustrates example half-bridge DC/DC and AC/DC converters according to some example embodiments.

Based on the description herein, ship power systems may be real-time simulated on, for example, a Xilinx VC707 Virtex-7 FPGA kit using FPGA solver engines developed with the LB-LMC C++ libraries. Such systems may include a dual bus power electronic system 1400 as shown in FIG. 14, which use half-bridge DC/DC and AC/DC converters 1500 as depicted in FIG. 15. The converters were all open-looped controlled to operate with 100 kHz switching frequency. The systems' solver engines were each synthesized and implemented using Xilinx Vivado Hlx suite, and then run on the Virtex-7 FPGA in real-time using 50 ns time step and 72-bit fixed point real numerical values.

Figure 16:
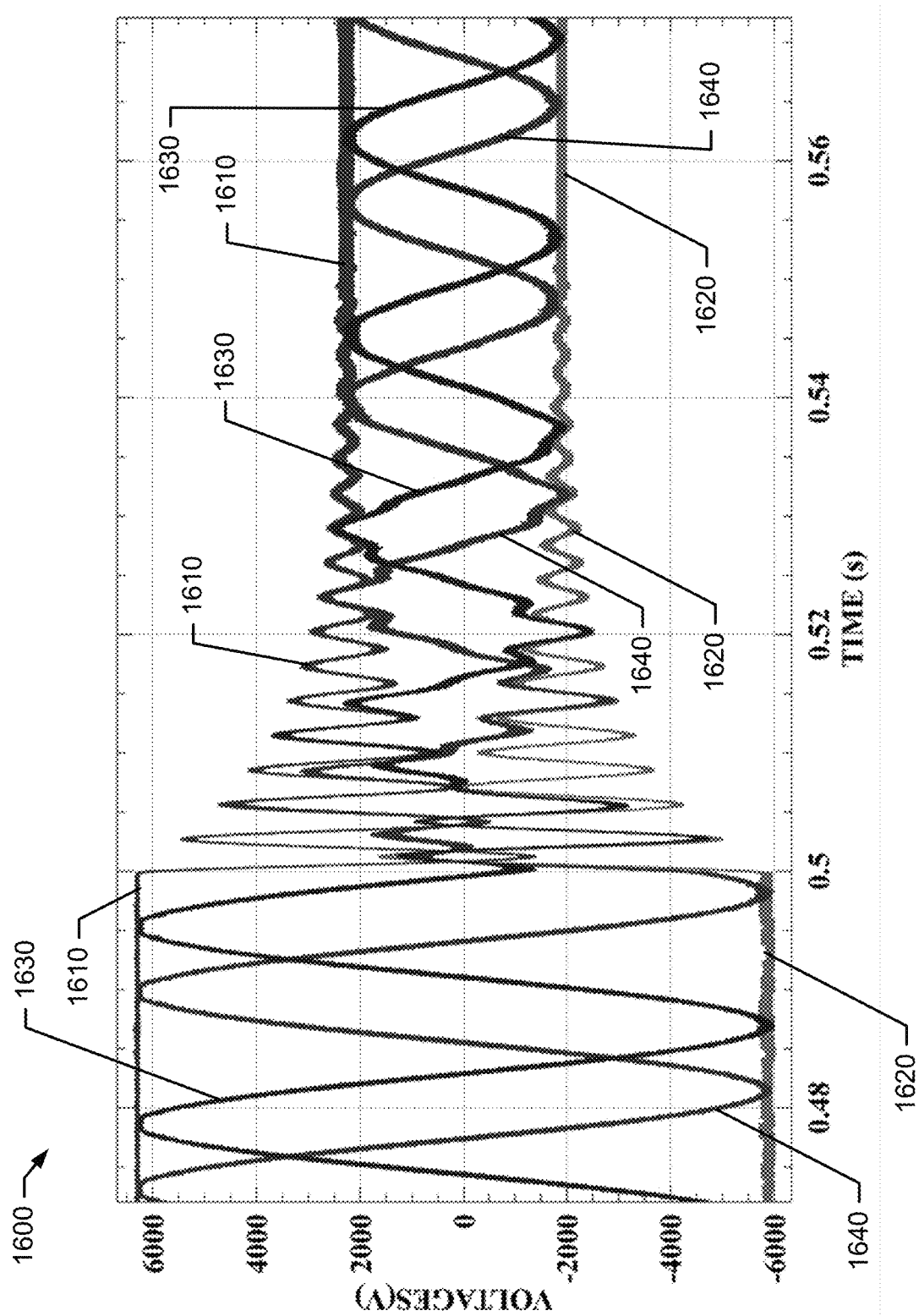
FIG. 16 illustrates a graph of DC bus voltages and two of the phase voltages of a converter from a dual bus system according to some example embodiments.

Solver solutions for node voltages were captured from the FPGA using a Texas Instruments (TI) DAC34H84EVM, 1.25 Gbps, 4-channel, digital-to-analog converter kit and an oscilloscope. Shown in the graph 1600 of FIG. 16 are the DC bus voltages 1610 and 1620 of ±6 kV and two of the phase voltage outputs 1630 and 1640 of a converter from the dual bus system, as the DC/DC converters feeding the DC bus lower the voltage to a third of the level. These results indicate how the solvers, running with 50 ns time step, are able to capture high frequency transient behavior of a system.

Figure 17:
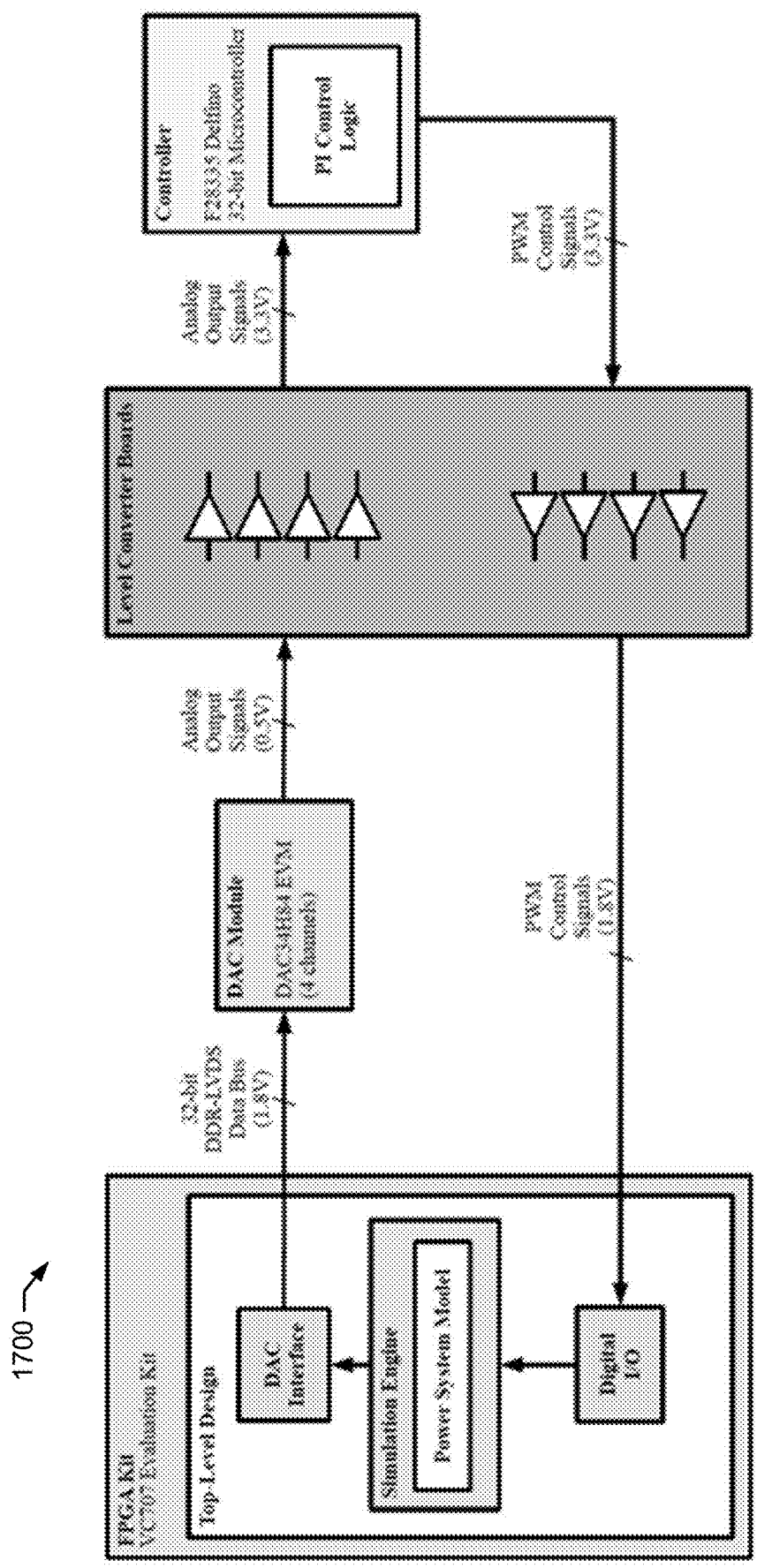
FIG. 17 illustrates a Hardware-In-the-Loop (HIL) simulation platform according to some example embodiments.

A Hardware-In-the-Loop (HIL) simulation platform 1700 of FIG. 17 may be used to test high switching frequency converters utilizing LB-LMC solvers developed with the C++ libraries. The platform, as depicted in FIG. 17, may consist of the a FPGA and DAC simulation platform described herein, but also may include a signal voltage level converter board and a TI Delfino microcontroller to run external controllers outside the real-time simulator.

Figure 18:
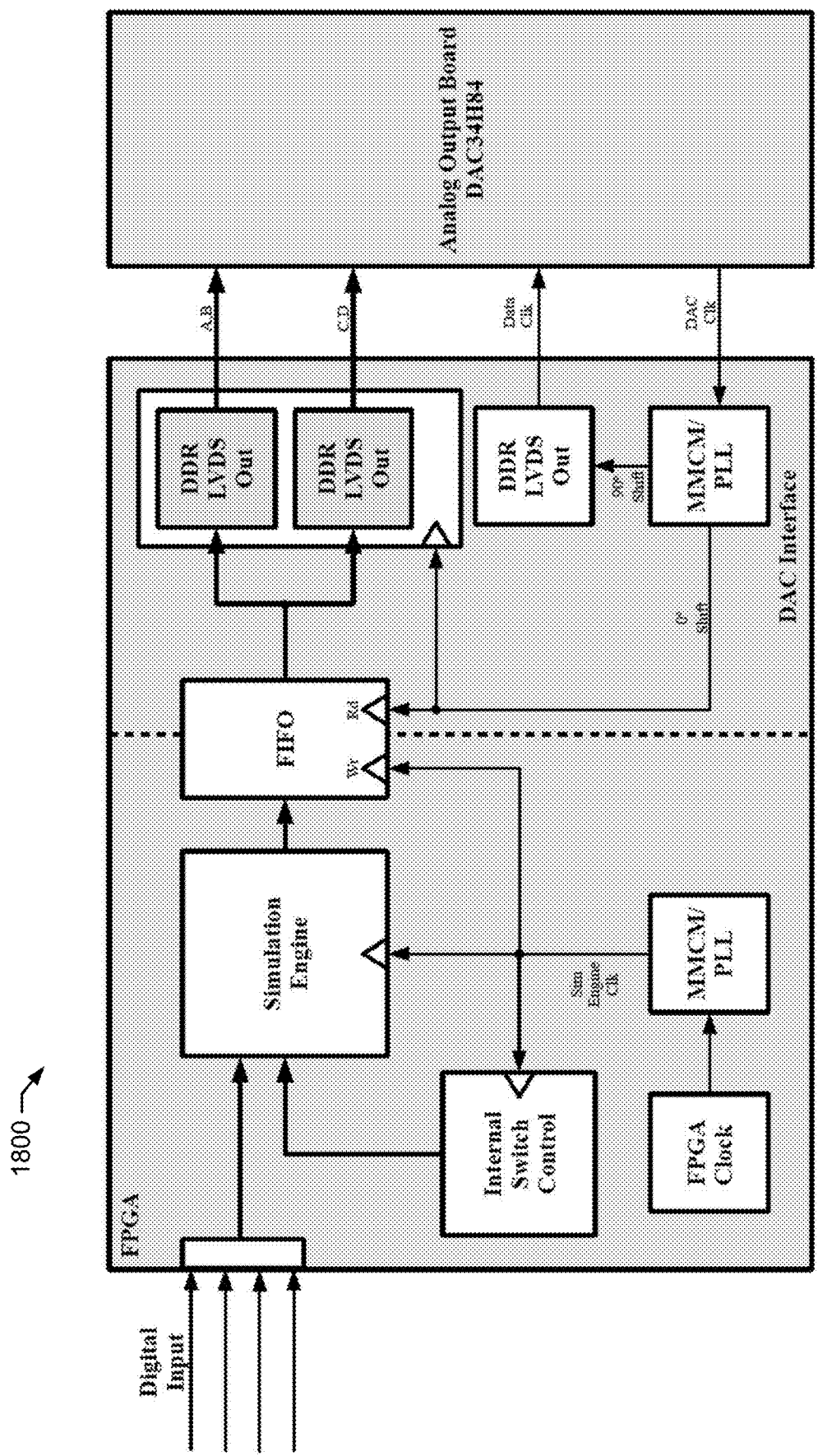
FIG. 18 illustrates a top-level design on an FPGA of a HIL platform according to some example embodiments.

A top-level design 1800 on the FPGA of this HIL platform as shown in FIG. 18, serves as an example to interface the solver engines to other hardware. Digital signals from the external controller to the solver engine are asynchronous to the solver and therefore registered in the FPGA through a chain of flip-flops to synchronize the signals into the clock domain of the solver engine. The solver engine may pass several of its solutions for digital-to-analog conversion to the DAC, after format conversion to 16-bit signed integers from 72-bit fixed-point internally, by first passing its data through a FIFO buffer, if the DAC and solver core are operating in different clock domains. After moving through the FIFO buffer, the solutions may be passed through Dual Data Rate (DDR) I/O registers and clocked into the DAC with a clock that is ninety degrees out of phase with the clock driving the DAC. Other cores on the FPGA that interact with the solver engine run at same clock domain and rate as the engine core, and transfer data through normal registers without synchronization logic.

Figure 19:
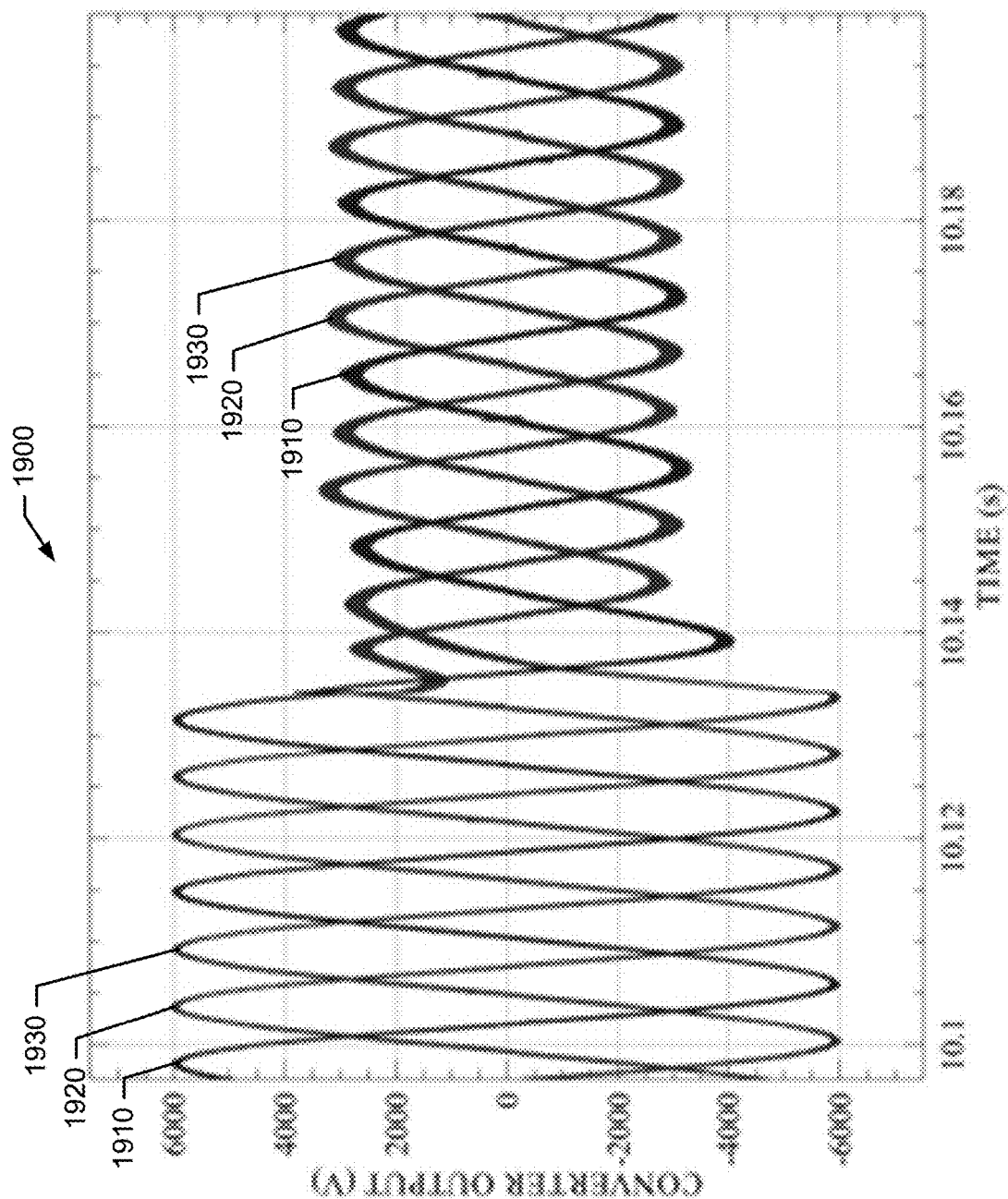
FIG. 19 illustrates a graph of three phase voltages of a converter from a dual bus system according to some example embodiments.
Figure 20:
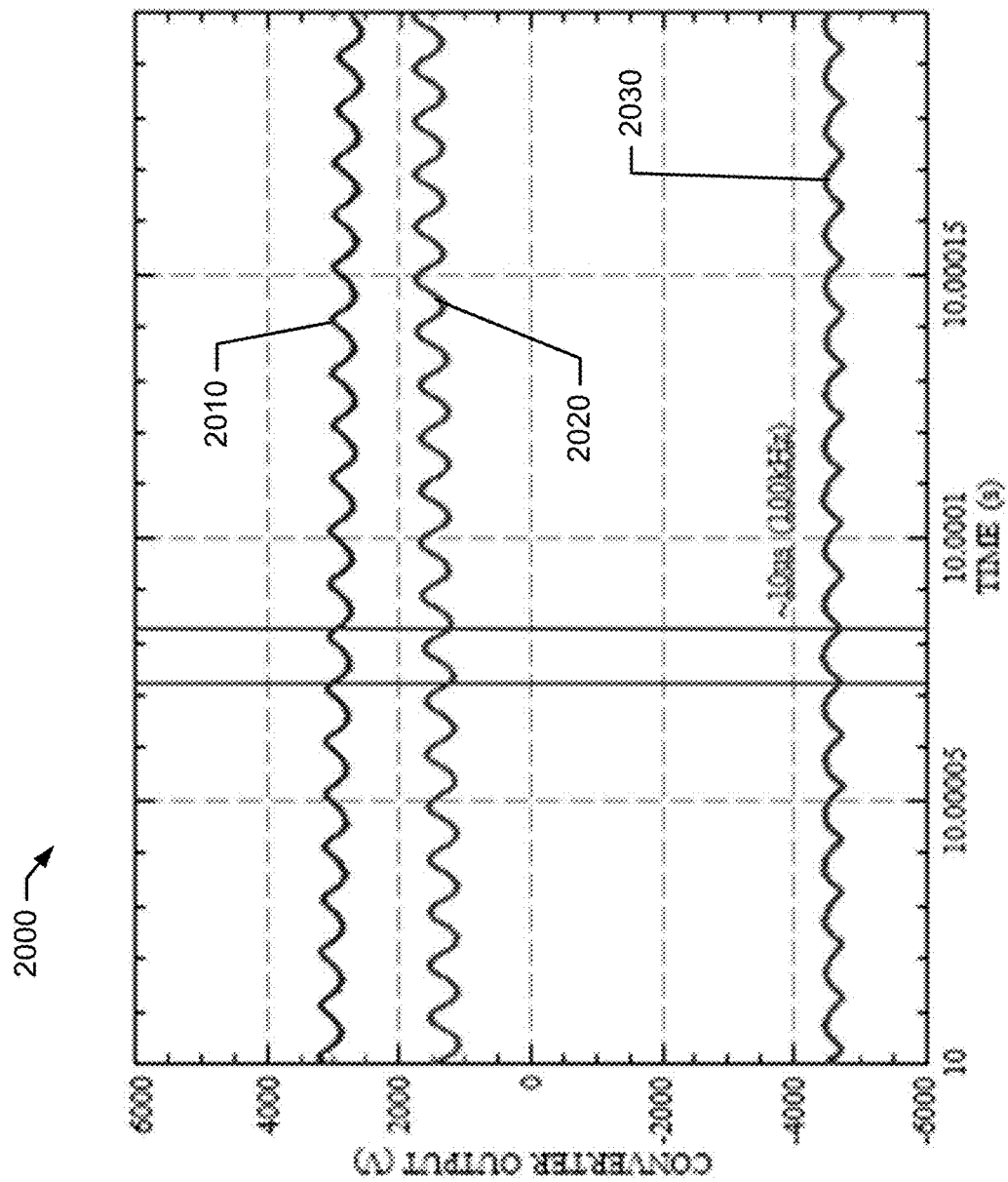
FIG. 20 illustrates a graph of a switching ripple of the three phase voltages of a converter from a dual bus system according to some example embodiments.

The platform was demonstrated by performing a HIL test on a 3-phase converter, within a FPGA RT transient simulation of the dual bus system, controlling the converter with a real external closed-loop voltage controller implemented on the microcontroller, operating with 100 kHz switching frequency. The three phase output voltages 1910, 1920, and 1930 of the controlled converter were captured in real-time, as shown in the graph 1900 presented in FIG. 19 when the controller was triggered to lower output voltage. Shown in FIG. 20 is a zoomed view of the switching ripple on the output voltages 2010, 2020, and 2030, showing the 100 kHz frequency component is realizable with using 50 ns time step.

Accordingly, C++ libraries for the development of fast real-time power electronic system solvers are described herein for implementation with various example embodiments. Examples described herein demonstrate that 50 ns time step capabilities, and I/O flexibility, of FPGA-based solvers created with these libraries can be realized. Through these libraries, faster and more capable real-time simulator platforms can be achieved.

Figure 21:
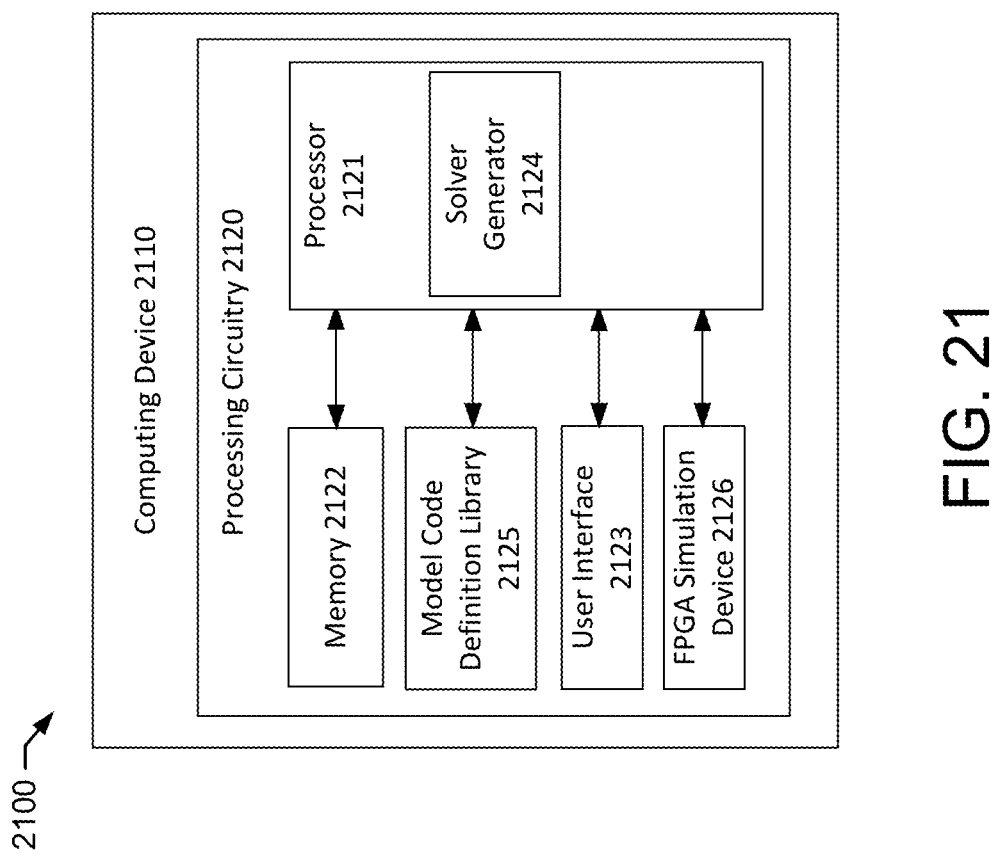
FIG. 21 illustrates a block diagram of an example system and computing device configured to generate a simulator of a target system according to some example embodiments.

Now referring to FIG. 21, an example system 2100 and apparatus in the form of an example computing device 2110 is provided. The example computing device 2110 comprises processing circuitry 2120. Processing circuitry 2120 may, in turn, comprise a processor 2121, a memory 2122, and a user interface 2130. According to some example embodiments, the processing circuity 2120 may also include a solver generator 2124, a model code definition library 2125, and an FPGA simulation device 2126. According to some example embodiments, the solver generator 2124 may be implemented on or embodied by the processor 2121, and, as described herein, the processor 2121 may be configured to perform the functionalities described with respect to the solver generator 2124. The model code definition library 2125 may be a data structure of information, such as a database, that stores model code definitions for components as described herein. According to some example embodiments, the model code definition library 2125 may be stored in the memory 2122, or in another memory that may even be external to the processing circuitry 2120. Additionally, the FPGA simulation device 2126 may be implemented and embodied by, the processor 2121. The FPGA simulation device 2126 may be configured to interface or connect to external components to facilitate, for example, simulation testing. However, according to some example embodiments, the FPGA simulation device 2126 may a separate device that is external to the computing device 2110. Additionally, the computing device 2110 may include additional components not shown in FIG. 21 and the processing circuitry 2120 may be operably coupled to other components of the system 2100 or a simulation platform that are not shown in FIG. 21.

Further, according to some example embodiments, processing circuitry 2120 may be in operative communication with or embody, the memory 2122, the processor 2121, the user interface 2130, the solver generator 2124, the model code definition library 2125, and the FPGA simulation device 2126. Through configuration and operation of the memory 2122, the processor 2121, and other components, the processing circuitry 2120 may be configurable to perform various operations as described herein, including the operations and functionalities described herein. In this regard, the processing circuitry 2120 may be configured to perform solver code generation, computational processing, memory management, user interface control and monitoring, and, according to an example embodiment. In some embodiments, the processing circuitry 2120 may be embodied as a chip or chip set. In other words, the processing circuitry 2120 may comprise one or more physical packages (e.g., chips) including materials, components or wires on a structural assembly (e.g., a baseboard). The processing circuitry 2120 may be configured to receive inputs (e.g., via peripheral components), perform actions based on the inputs, and generate outputs (e.g., for provision to peripheral components). In an example embodiment, the processing circuitry 2120 may include one or more instances of a processor 2121, associated circuitry, and memory 2122. As such, the processing circuitry 2120 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 2122 may include one or more non-transitory memory devices such as, for example, volatile or non-volatile memory that may be either fixed or removable. The memory 2122 may be configured to store information, data, applications, instructions or the like for enabling, for example, the functionalities described herein. The memory 2122 may operate to buffer instructions and data during operation of the processing circuitry 2120 to support, for example, higher-level functionalities, and may also be configured to store instructions for execution by the processing circuitry 2120. The memory 2122 may also store various information including model code definitions of the model code definition library 2125. According to some example embodiments, various data stored in the memory 2122 may be generated based on other data and stored or the data may be retrieved via a communications interface and stored in the memory 2122.

As mentioned above, the processing circuitry 2120 may be embodied in a number of different ways. For example, the processing circuitry 2120 may be embodied as various processing means such as one or more processors 205 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 2120 may be configured to execute instructions stored in the memory 2122 or otherwise accessible to the processing circuitry 2120. As such, whether configured by hardware or by a combination of hardware and software, the processing circuitry 2120 may represent an entity (e.g., physically embodied in circuitry—in the form of processing circuitry 2120) capable of performing operations according to example embodiments while configured accordingly. Thus, for example, when the processing circuitry 2120 is embodied as an ASIC, FPGA, or the like, the processing circuitry 2120 may be specifically configured hardware for conducting the operations described herein. Alternatively, as another example, when the processing circuitry 2120 is embodied as an executor of software instructions, the instructions may specifically configure the processing circuitry 2120 to perform the operations described herein.

The user interface 2130 may be controlled by the processing circuitry 2120 to interact with peripheral components or devices of the computing device 2110 that can receive inputs from a user or provide outputs to a user. In this regard, via the user interface 2130, the processing circuitry 2120 may be configured to receive inputs from an input device which may be, for example, a touch screen display, a keyboard, a mouse, a microphone, or the like. The user interface 2130 may also be configured to provide control and outputs to peripheral devices such as, for example, a display (e.g., a touch screen display), speaker, or the like. The user interface 2130 may also produce outputs, for example, as visual outputs on a display, audio outputs via a speaker, or the like.

According to some example embodiments, the solver generator 2124, implemented by the processor 2121, may be configured to generate a simulator of a target system. In this regard, the solver generator 2124 may be configured to parse data defining operational components and component parameters of the target system, search for and obtain model code definitions for operational components within a library database (e.g., model code definition library 2125), customize the model code definitions based on the component parameters, construct a system model based on the customized model code definitions for the operational components, and generate solver code based the customized model code definitions of the target system. In this regard, the solver code may be indicative of input and output operation of the target system. The solver generator 2124 may be configured to concatenate the system model with the solver code to form a solver function definition for the target system, and convert the solver function definition into an field programmable gate array (FPGA) core or a CPU core for execution on a simulation device for the target system (e.g, FPGA simulation device 2126 or a CPU device).

According to some example embodiments, the solver generator 2124 may be further configured to load the FPGA core onto the FPGA simulation device to execute a simulation of the system on the FPGA simulation device in a testing environment. Additionally or alternatively, according to some example embodiments, the solver generator 2124 may be configured to parse the data defining the operational components and the component parameters of the target system formatted as a plain-text netlist. Additionally or alternatively, according to some example embodiments, the target system may be an electrical system. Additionally or alternatively, according to some example embodiments, the solver generator 2124 may be configured to generate the solver code as C++ code. Additionally or alternatively, according to some example embodiments, the solver generator 2124 may be configured to convert the solver definition function by compiling the solver definition function into the FPGA core in hardware description language (HDL). Additionally or alternatively, according to some example embodiments, solver generator 2124 may be configured to search for and obtain the model code definitions for the operational components within the library database, each model code definition in the database being for an operational component in the library database being defined as a discretized state space model that is embodied as a collection of voltage or current sources with accompanying conductances. Additionally or alternatively, according to some example embodiments, the voltage or current sources may be memory terms of the model code definitions and the conductances may be memoryless terms of the model code definitions. The model code definitions for nonlinear components may be discretized with explicit integration. Additionally, the solver generator 2124 may be configured to generate the solver code is further configured to separately evaluate the memory terms and the memoryless terms to generate the solver code such that nonlinear components are solvable via linear operations in a non-iterative process. Additionally or alternatively, according to some example embodiments, The solver generator 2124 may be configured to generate the solver code using a Latency-Based Linear Multi-step Compound (LB-LMC) approach. Additionally or alternatively, according to some example embodiments, execution on the FPGA simulation device 2126 as the simulation of the target system includes executing the simulation at less than or equal to 50 nanosecond simulation time steps.

Figure 22:
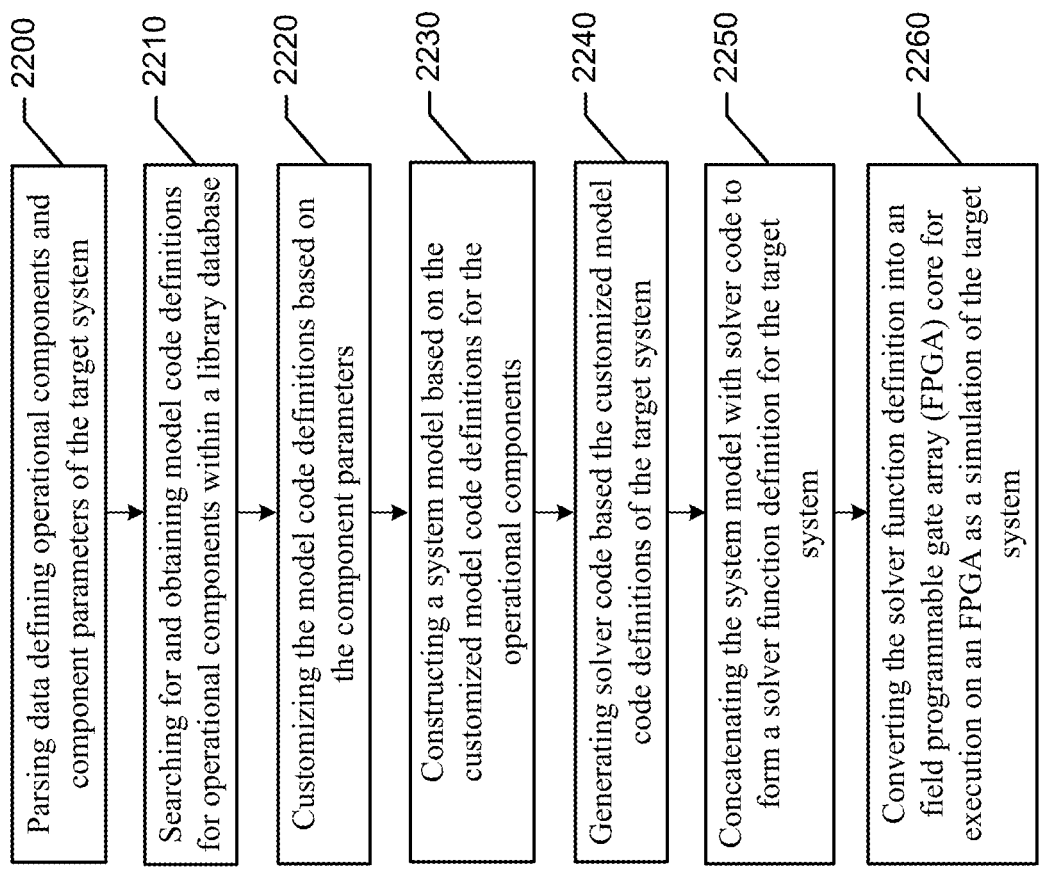
FIG. 22 illustrates a flow chart of an example method for generating a simulator of a target system according to some example embodiments.

Now referring to FIG. 22, an example method is provided. The example method may be for generating a simulator of a target system. The example method may comprise, at 2200, parsing data defining operational components and component parameters of the target system. At 2210, the example method may comprise searching for and obtaining model code definitions for operational components within a library database, Further, at 2220, the example method may comprise customizing the model code definitions based on the component parameters, and, at 2230, the example method may comprise constructing a system model based on the customized model code definitions for the operational components. The example method may further comprise generating solver code based the customized model code definitions of the target system, at 2240. In this regard, the solver code being indicative of input and output operation of the target system. At 2250, the example method may comprise concatenating the system model with the solver code to form a solver function definition for the target system, and, at 2260, the example method may comprise converting the solver function definition into an field programmable gate array (FPGA) core for execution on an FPGA simulation device for the target system.

According to some example embodiments, the example method may further comprise loading the FPGA core onto the FPGA simulation device to execute a simulation of the system on the FPGA simulation device in a testing environment. Additionally or alternatively, according to some example embodiments, parsing the data may include parsing the data defining the operational components and the component parameters of the target system formatted as a plain-text netlist. Additionally or alternatively, according to some example embodiments, the target system is an electrical system. Additionally or alternatively, according to some example embodiments, generating the solver code may include generating the solver code as C++ code. Additionally or alternatively, according to some example embodiments, converting the solver definition function may include compiling the solver definition function into the FPGA core in hardware description language (HDL).

Additionally or alternatively, according to some example embodiments, searching for and obtaining the model code definitions for the operational components within the library database may include searching for and obtaining the model code definitions within the library database, each model code definition for an operational component in the library database being defined as a discretized state space model that is embodied as a collection of voltage or current sources with accompanying conductances. Additionally or alternatively, according to some example embodiments, the voltage or current sources are memory terms of the model code definitions and the conductances are memoryless terms of the model code definitions, the model code definitions for nonlinear components may be discretized with explicit integration, and generating the solver code may comprise separately evaluating the memory terms and the memoryless terms to generate the solver code such that nonlinear components are solvable via linear operations in a non-iterative process. Additionally or alternatively, according to some example embodiments, generating the solver code may include generating the solver code using a Latency-Based Linear Multi-step Compound (LB-LMC) approach. Additionally or alternatively, according to some example embodiments, execution on the FPGA as the simulation of the target system may include executing the simulation at less than or equal to 50 nanosecond simulation time steps.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for generating a simulator of a target system, the apparatus comprising processing circuitry configured to:
   parse data defining operational components and component parameters of the target system;
   search for and obtain model code definitions for operational components within a library database;
   customize the model code definitions based on the component parameters;
   construct a system model based on the customized model code definitions for the operational components;
   generate solver code based on the customized model code definitions of the target system, the solver code being indicative of input and output operation of the target system;
   concatenate the system model with the solver code to form a solver function definition for the target system; and
   convert the solver function definition into a field programmable gate array (FPGA) core or a central processing unit (CPU) core for execution on a simulation device for the target system.

2. The apparatus of claim 1, wherein the processing circuity is further configured to load the FPGA or CPU core onto the simulation device to execute a simulation of the system on the simulation device in a testing environment.

3. The apparatus of claim 1, wherein the processing circuitry configured to parse the data includes being configured to parse the data defining the operational components and the component parameters of the target system formatted as a plain-text netlist.

4. The apparatus of claim 1, wherein the target system is an electrical system.

5. The apparatus of claim 1, wherein the processing circuity configured to generate the solver code includes being configured to generate the solver code as C++ code.

6. The apparatus of claim 1, wherein the processing circuity configured to convert the solver definition function includes being configured to compile the solver definition function into the FPGA or CPU core in hardware description language (HDL).

7. The apparatus of claim 1, wherein the processing circuity configured to search for and obtain the model code definitions for the operational components within the library database includes being configured to search for and obtain the model code definitions within the library database, each model code definition for an operational component in the library database being defined as a discretized state space model that is embodied as a collection of voltage or current sources with accompanying conductances.

8. The apparatus of claim 7, wherein the voltage or current sources are memory terms of the model code definitions and the conductances are memoryless terms of the model code definitions;
   wherein the model code definitions for nonlinear components are discretized with explicit integration;
   wherein the processing circuity configured to generate the solver code is further configured to separately evaluate the memory terms and the memoryless terms to generate the solver code such that nonlinear components are solvable via linear operations in a non-iterative process.

9. The apparatus of claim 1, wherein the processing circuitry is configured to generate the solver code using a Latency-Based Linear Multi-step Compound (LB-LMC) approach.

10. The apparatus of claim 1, wherein execution on the simulation device includes executing the simulation at less than or equal to 50 nanosecond simulation time steps.

11. A method for generating a simulator of a target system, the comprising:
   parsing data defining operational components and component parameters of the target system;
   searching for and obtaining model code definitions for operational components within a library database;
   customizing the model code definitions based on the component parameters;
   constructing a system model based on the customized model code definitions for the operational components;
   generating solver code based on the customized model code definitions of the target system, the solver code being indicative of input and output operation of the target system;
   concatenating the system model with the solver code to form a solver function definition for the target system; and
   converting the solver function definition into a field programmable gate array (FPGA) core or a central processing unit (CPU) core for execution on a simulation device for the target system.

12. The method of claim 11 further comprising loading the FPGA or CPU core onto the simulation device to execute a simulation of the system on the simulation device in a testing environment.

13. The method of claim 11, wherein parsing the data includes parsing the data defining the operational components and the component parameters of the target system formatted as a plain-text netlist.

14. The method of claim 11, wherein the target system is an electrical system.

15. The method of claim 11, wherein generating the solver code includes generating the solver code as C++ code.

16. The method of claim 11, wherein converting the solver definition function includes compiling the solver definition function into the FPGA or CPU core in hardware description language (HDL).

17. The method of claim 11, wherein searching for and obtaining the model code definitions for the operational components within the library database includes searching for and obtaining the model code definitions within the library database, each model code definition for an operational component in the library database being defined as a discretized state space model that is embodied as a collection of voltage or current sources with accompanying conductances.

18. The method of claim 17, wherein the voltage or current sources are memory terms of the model code definitions and the conductances are memoryless terms of the model code definitions;
   wherein the model code definitions for nonlinear components are discretized with explicit integration;
   wherein generating the solver code comprises separately evaluating the memory terms and the memoryless terms to generate the solver code such that nonlinear components are solvable via linear operations in a non-iterative process.

19. The method of claim 11, wherein generating the solver code includes generating the solver code using a Latency-Based Linear Multi-step Compound (LB-LMC) approach.

20. The method of claim 11, wherein execution on the simulation device includes executing the simulation at less than or equal to 50 nanosecond simulation time steps.

* * * * *